(12) United States Patent
Izaki et al.

(10) Patent No.: US 8,095,627 B2
(45) Date of Patent: Jan. 10, 2012

(54) INFORMATION PROCESSING DEVICE, COMMUNICATION SYSTEM, MANAGEMENT DEVICE, METHOD, AND PROGRAM

(75) Inventors: Takeshi Izaki, Nagoya (JP); Sunao Kawai, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 891 days.

(21) Appl. No.: 11/427,925

(22) Filed: Jun. 30, 2006

(65) Prior Publication Data
US 2007/0043805 A1 Feb. 22, 2007

(30) Foreign Application Priority Data
Jun. 30, 2005 (JP) .................................. 2005191957

(51) Int. Cl.
G06F 15/177 (2006.01)
(52) U.S. Cl. ........................................ 709/221; 709/220
(58) Field of Classification Search ............ 709/220–222
See application file for complete search history.

(56) References Cited

U.S. PATENT DOCUMENTS

| 6,735,641 | B1 | 5/2004 | Kobayashi et al. |
| 2001/0029541 | A1 | 10/2001 | Tomita |
| 2002/0154333 | A1 | 10/2002 | Akashi |
| 2002/0157022 | A1 | 10/2002 | Katada et al. |
| 2004/0006618 | A1 | 1/2004 | Kasai et al. |
| 2005/0060407 | A1 | 3/2005 | Nagai |
| 2005/0071493 | A1 | 3/2005 | Lee |
| 2007/0260722 | A1 | 11/2007 | Lee |

FOREIGN PATENT DOCUMENTS

| EP | 1075114 A2 | 2/2001 |
| EP | 1248434 A2 | 10/2002 |
| JP | 2001-043070 A | 2/2001 |
| JP | 2001-043070 A1 | 2/2001 |
| JP | 2001-344160 A | 12/2001 |
| JP | 2002-304277 A | 10/2002 |
| JP | 2002333958 A | 11/2002 |
| JP | 2003-150462 A1 | 5/2003 |

(Continued)

OTHER PUBLICATIONS

Arai, Takayuki; Firewall Device (Machine Translation); JP2004054488; Jul. 18, 2002.*

(Continued)

Primary Examiner — Ian N Moore
Assistant Examiner — Jackie Zuniga
(74) Attorney, Agent, or Firm — Baker Botts L.L..P.

(57) ABSTRACT

An information processing device comprises: a communication unit which communicates with each device on a network, determines whether to accept data received from a device on the network or not based on a prescribed criterion, and transfers the received data to the inside in response to the received data being determined to be accepted based on the criterion; a setting change unit which makes a setting change to the criterion of the communication unit according to instructions represented by setting request data in response to receipt of the setting request data requesting for the setting change of the criterion from a device on the network via the communication unit; and a judgment unit which judges whether the communication with the device as the sender of the setting request data can be performed normally via the communication unit or not in response to the setting change by the setting change unit according to the setting request data.

10 Claims, 16 Drawing Sheets

FOREIGN PATENT DOCUMENTS

| | | |
|---|---|---|
| JP | 2004-040433 A | 2/2004 |
| JP | 2004-054488 A1 | 2/2004 |
| JP | 2005-073172 A | 3/2005 |
| JP | 2005-108215 A | 4/2005 |

OTHER PUBLICATIONS

Japan Patent Office, Decision of Rejection for Japanese Patent Appl'n. No. JP2005-191957(corresponding to above-captioned patent appl'n), dated Oct. 23, 2007.

Japan Patent Office, Office Action mailed Jul. 24, 2007 for Priority Application No. JP 2005-191957.

European Patent Office, European Search Report for Related EP Application No. 06253452 dated Dec. 4, 2006.

Japan Patent Office, Notification of Reasons for Rejection for Japanese Patent Application No. 2007-244884 (counterpart to above-captioned patent application), dispatched Sep. 7, 2010.

Japan Patent Office, Decision of Rejection for Japanese Patent Application No. 2007-244884 (counterpart to above-captioned patent application), dispatched Nov. 16, 2010.

Japan Patent Office, Questioning for Japanese Patent Application No. 2007-244884 (counterpart to abovecaptioned patent application), dispatched Oct. 25, 2011.

* cited by examiner (REGULAR SETTING COMPLETION NOTIFICATION SCREEN)

------(CURRENT SETTINGS)------------------------------
--------------------------------------------------------
--------------------------------------------------------
SETTING (REGULAR SETTING) HAS BEEN COMPLETED WITH
ABOVE PARAMETERS.

(REGULAR SETTING CONFIRMATION SCREEN)

------(CURRENT SETTINGS)------------------------------
--------------------------------------------------------
--------------------------------------------------------
PROVISIONAL SETTING HAS BEEN MADE,
MAKE REGULAR SETTING WITH ABOVE PARAMETERS?

[ SET ]  [ CANCEL ]

FIG.10B

(SETTING RESTORATION NOTIFICATION SCREEN)

------(CURRENT SETTINGS)------------------------------
--------------------------------------------------------
--------------------------------------------------------
SETTING HAVE BEEN RESTORED AS ABOVE.

INFORMATION PROCESSING DEVICE, COMMUNICATION SYSTEM, MANAGEMENT DEVICE, METHOD, AND PROGRAM

CROSS-REFERENCE TO RELATED APPLICATION

This application claims priority under 35 U.S.C. §119 from Japanese Patent Application No. 2005-191957, filed on Jun. 30, 2005. The entire subject matter of the application is incorporated herein by reference.

FIELD

Aspects of the disclosure relate to an information processing device having a communication function, a communication system employing the information processing device, a management device for managing the information processing device, and programs used by the information processing device and the management device.

BACKGROUND

Information processing devices capable of performing TCP/IP communication have widely been used today as information processing devices having the communication function. Some of such information processing devices are provided with a function of restricting access to the device from external devices based on a restriction table containing IP (Internet Protocol) addresses regarding the permission of the access (IP addresses of devices to be permitted to access the information processing device) and IP addresses regarding the prohibition of the access (IP addresses of devices to be prohibited from accessing the information processing device. Since such an information processing device is capable of blocking unauthorized access from outside, illicit use of the information processing device by an outsider, wasting expendables (paper, ink, toner, etc. when the information processing device is a printer having the communication function) and disabling authorized users from using the device, can be prevented while also blocking malicious access attempting to cause trouble to the device, which is convenient for the authorized users of the device.

However, an information processing device of this type prohibits the access to the device according to the restriction table even when an IP address is erroneously registered in the restriction table, which can lead to prohibition of access from a management device which should originally be permitted to access the information processing device.

In a system in which an administrator or manager can make settings of the restriction table of the information processing device from a management device via a network, if the access to the information processing device from the management device is disabled due to an erroneous setting to the restriction table, the administrator can not make any more settings to the restriction table from the management device via the network. In such cases, the administrator has to change the settings of the restriction table by directly operating the information processing device, which is highly inconvenient.

Of course such trouble never occurs if the administrator never registers an erroneous IP address in the restriction table. However, in a system letting the administrator specify an IP address range regarding the permission or prohibition of the access to the information processing device, the administrator can sometimes fail to notice that the IP address of the management device is within a prohibiting IP address range. In a system that registers each of permitting IP addresses according to operation information representing key operations, etc. by the administrator, the administrator, being distracted by the IP address registration task regarding devices other than the management device, can forget to register the IP address of the management device.

SUMMARY

Aspect of the disclosure are advantageous in that at least one of an information processing device, a communication system, a management device and programs, capable of preventing the disablement of settings to the information processing device via a network even in case of a setting error to the information processing device, can be provided.

BRIEF DESCRIPTION OF THE ACCOMPANYING DRAWINGS

FIG. 10A is an explanatory drawing showing an example of the composition of a regular setting completion notification screen displayed by the PC.

FIG. 10B is an explanatory drawing showing an example of the composition of a regular setting confirmation screen displayed by the PC.

FIG. 10C is an explanatory drawing showing an example of the composition of a setting restoration notification screen displayed by the PC.

DETAILED DESCRIPTION

General Overview

Figure 1:
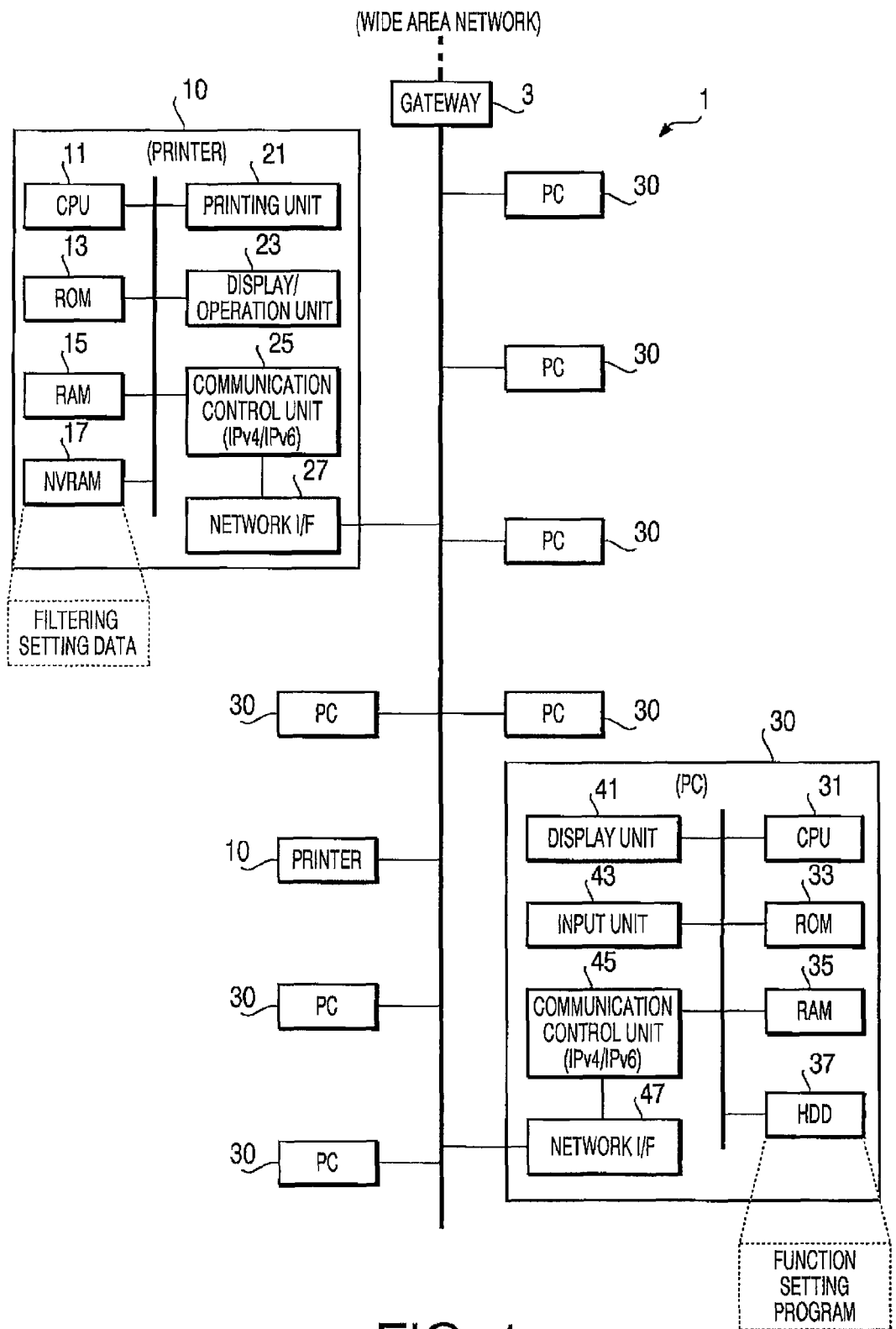
FIG. 1 is a block diagram showing the composition of a communication system in accordance with a first example.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

In accordance with an aspect of the present invention, there is provided an information processing device connected to a network comprising: a communication unit which communicates with each device on a network, determines whether to accept data received from a device on the network or not based on a prescribed criterion, and transfers the received data to the inside of the information processing device in response to the received data being determined to be accepted based on the prescribed criterion; a setting change unit which makes a setting change to the prescribed criterion of the communication unit according to instructions represented by setting request data in response to receipt of the setting request data requesting for the setting change of the criterion from a device on the network via the communication unit; and a judgment unit which judges whether the communication with the device as the sender of the setting request data can be performed normally via the communication unit or not in response to the setting change by the setting change unit according to the setting request data.

With the information processing device configured as above, the setting change to the criterion of the communication unit according to the setting request data can be invalidated as needed based on the judgment by the judgment unit. Therefore, even when a user operating an external management device erroneously inputs the instructions to be contained in the setting request data and an erroneous setting change is made to the criterion of the communication unit of the information processing device according to the erroneous instructions, the information processing device can be prevented from being continuously disabled from accepting data from the management device, by which the user is prevented from becoming incapable of making settings of the information processing device from the management device via the network.

The above effects (prevention of the above problems caused by erroneous setting instructions) can be achieved efficiently by, for example, configuring the information processing device as below.

Preferably, the information processing device further comprises a setting restoration unit which restores the criterion set for the communication unit before the setting change by the setting change unit in response to the judgment unit judging that the communication with the device as the sender of the setting request data can not be performed normally via the communication unit.

With the information processing device configured as above, the settings of the communication unit are restored to the original settings (settings before the setting change) if the communication with the device (sender of the setting request data) can not be performed normally via the communication unit due to a setting error by the user. Therefore, the user is prevented from becoming incapable of making settings of the information processing device from the management device via the network even if erroneous settings (erroneous instructions) are made by the user.

In the above configuration in which the erroneous setting change is invalidated by the setting restoration unit by restoring the settings to the original settings, the user can mistakenly recognize that the settings made according to the user's instructions are still valid in the information processing device. To avoid the problem, the information processing device may be configured as below.

Preferably, the information processing device further comprises a restoration notification unit which transmits restoration notification data, indicating that the restoration by the setting restoration unit has been made, to the device as the sender of the setting request data via the communication unit in response to the restoration having been made by the setting restoration unit.

With the information processing device configured as above, the restoration notification data indicating that the settings have been restored to the original settings is transmitted to the device (sender of the setting request data), by which the device and the user are prevented from mistakenly recognizing that the settings made according to the user's instructions are valid in the information processing device.

In cases where the information processing device is designed to read out the criterion from a nonvolatile storage device (e.g. NVRAM) and set the criterion to the communication unit at the startup, it is possible to configure the information processing device to incorporate the setting change according to the setting request data (or the criterion currently employed by the communication unit after the setting change) into the criterion stored in the nonvolatile storage device only if the communication with the device (sender of the setting request data) can be performed normally after the setting change according to the setting request data. Therefore, the information processing device may be configured as below.

Preferably, the information processing device further comprises: a nonvolatile storage device which stores the criterion to be set to the communication unit; a setting unit which sets the criterion stored in the nonvolatile storage device to the communication unit at the startup of the information processing device; and a regular setting unit which updates the criterion stored in the nonvolatile storage device to the criterion set by the setting change unit to the communication unit in response to the judgment unit judging that the communication with the device as the sender of the setting request data can be performed normally via the communication unit.

With the information processing device configured as above, the criterion stored in the nonvolatile storage device (i.e. the criterion that is set to the communication unit at the startup of the information processing device) is updated according to the setting change only if the communication with the device (sender of the setting request data) can be performed normally via the communication unit after the setting change. Therefore, the user is prevented from becoming incapable of making settings of the information processing device from the device (management device) via the network even when erroneous settings are made (erroneous instructions are inputted) by the user. Specifically, even when the user operating an external management device erroneously inputs the setting change instructions (to be contained in the setting request data) and an erroneous setting change to the criterion of the communication unit according to the erroneous instructions disables the communication between the information processing device and the management device via the communication unit, the user is allowed to make settings of the information processing device from the management device via the network again only by restarting the information processing device.

However, if the regular setting (the update of the criterion stored in the nonvolatile storage device according to the setting change) is made by the regular setting unit without informing the user about the regular setting, the user might feel anxious about whether the settings (setting change) made according to the user's instructions are valid in the information processing device or not. To avoid the problem, the information processing device may be configured as below.

Preferably, the information processing device further comprises a regular setting notification unit which transmits regular setting notification data, indicating that the update by the regular setting unit has been made, to the device as the sender of the setting request data via the communication unit in response to the update having been made by the regular setting unit.

With the information processing device configured as above, the regular setting notification data indicating that the update by the regular setting unit has been made is transmitted to the device (sender of the setting request data) and the user is informed of the completion of the regular setting (update), by which the user is saved from feeling anxious about whether the settings (setting change) made by the user are valid in the information processing device or not.

The judgment unit of the information processing device may be configured as below.

Preferably, the judgment unit is configured to judge that the communication with the device as the sender of the setting request data can be performed normally via the communication unit in response to data being received from the device via the communication unit within a prescribed time period from the setting change by the setting change unit, while judging that the communication with the device can not be performed normally via the communication unit in response to data can not being received from the device via the communication unit within the prescribed time period.

If the communication unit has a filtering function based on the IP address of the sender of data, an erroneous setting regarding the IP address can cause the communication unit to always discard data from the management device and disable the setting change unit from receiving the setting request data from the management device. With the information processing device configured as above, the settings (setting change) according to the setting request data can be invalidated if data can not be received from the management device (sender of the setting request data) within a prescribed time period from the setting change. Therefore, the disablement of subsequent settings to the information processing device via the network can be avoided even if erroneous settings are made by the user.

Preferably, the information processing device further comprises a setting change notification unit which transmits setting change notification data, indicating that the setting change by the setting change unit has been made, to the device as the sender of the setting request data via the communication unit in response to the setting change having been made by the setting change unit.

With the information processing device configured as above, it is possible to let the device (sender of the setting request data) determine proper timing for transmitting test data (for checking whether communication can be performed normally or not) based on the reception of the setting change notification data from the information processing device. In other words, the information processing device can prompt the device (sender of the setting request data) to transmit the test data just after the setting change by the setting change unit, by which the judgment on whether the communication can be performed normally or not can be made smoothly.

Preferably, the criterion is in response to information representing at least one address range, and the communication unit determines to accept the data received from a device on the network in response to an address of the device as the sender of the data being within the address range represented by the criterion (set to itself), while determining not to accept the data received from the device in response to the address of the device being outside the address range represented by the criterion.

In the case where the determination by the communication unit is made as above, if the user erroneously sets the address range not to comprise the address (e.g. IP address) of the management device, the user is generally disabled from making settings to the information processing device again from the management device. However, the setting change can be invalidated by the information processing device in case of such a setting error, by which the disablement of the address range setting to the information processing device from the management device via the network (due to such a setting error by the user) can be avoided.

Preferably, the criterion is in response to information representing at least one address range, and the communication unit determines to accept the data received from a device on the network in response to an address of the device as the sender of the data being outside the address range represented by the criterion (set to itself), while determining not to accept the data received from the device if the address of the device is within the address range represented by the criterion.

In the case where the determination by the communication unit is made as above, if the user erroneously sets the address range to comprise the address of the management device, the user is generally disabled from making settings to the information processing device again from the management device. However, the setting change can be invalidated by the information processing device in case of such a setting error, by which the disablement of the address range setting to the information processing device from the management device via the network (due to such a setting error by the user) can be avoided.

While data (program, etc.) for receiving the setting change instructions regarding the criterion from the user may be supplied to the user and to the management device via a record medium such as a CD-ROM, the data may also be supplied to the management device via the network by equipping the information processing device with a Web server function as below.

Preferably, the information processing device further comprises a setting screen transmission unit which transmits setting screen data, to be used by a device on the network for displaying a setting screen for receiving setting change instructions regarding the criterion from a user and transmitting the setting request data representing the setting change instructions inputted by the user referring to the setting screen to the information processing device, to the device via the communication unit in response to data requesting the setting screen being received from the device via the communication unit.

With the information processing device configured as above, the user is relieved of the need of installing a criterion setting program (program for setting the criterion) in a personal computer, etc. (used as the management device) via a record medium, which is remarkably convenient for the user.

While whether communication can be performed normally or not can be judged by letting the management device transmit test data and letting the information processing device make the judgment by checking reception status of the test data as mentioned above, the convenience for the user can be enhanced by configuring the information processing device to supply data (program, etc.), to be used for transmitting the test data, to the management device via the network. Therefore, the information processing device may be configured as below.

Preferably, the information processing device further comprises a confirmation screen transmission unit which transmits confirmation screen data, to be used by the device as the sender of the setting request data for displaying a confirmation screen for receiving a regular setting instruction from the user and transmitting test data to the information processing device according to the regular setting instruction inputted by the user referring to the confirmation screen, to the device via the communication unit in response to the setting change having been made by the setting change unit. The judgment unit is configured to judge that the communication with the device as the sender of the setting request data can be performed normally via the communication unit in response to the test data being received from the device via the communication unit within a prescribed time period from the transmission of the confirmation screen data by the confirmation screen transmission unit, while judging that the communication with the device can not be performed normally via the communication unit in response to the test data can not being received from the device via the communication unit within the prescribed time period.

With the information processing device configured as above, the user is relieved of the need of installing a program in the management device via a CD-ROM, etc. since the data (program, etc.) to be used for transmitting the test data is supplied from the information processing device to the management device via the network, which is convenient for the user. Further, the user can cancel the setting change by not inputting the regular setting instruction to the confirmation screen and intentionally stopping the transmission of the test data. Thus, the information processing device allows the user to make the cancellation of the setting change with ease.

In accordance with another aspect of the present invention, there is provided a communication system comprising: an information processing device which comprises a communication unit (communicating with each device on a network, determining whether to accept data received from a device on the network or not based on a prescribed criterion, and transferring the received data to the inside of the information processing device in response to the received data being determined to be accepted based on the prescribed criterion), communicates data with each device on the network via the communication unit and executes a process according to data that is received by the communication unit from a device on the network and transferred from the communication unit; and a management device which communicates with the information processing device via the network and manages the information processing device. The information processing device further comprises: a setting change unit which makes a setting change to the prescribed criterion of the communication unit according to instructions represented by setting request data in response to receipt of the setting request data requesting for the setting change of the prescribed criterion from a device on the network via the communication unit; and a judgment unit which judges whether the communication with the device as the sender of the setting request data can be performed normally via the communication unit or not in response to the setting change by the setting change unit according to the instructions represented by the setting request data. The management device comprises: a setting screen display control unit which displays a setting screen, for receiving setting change instructions regarding the criterion from a user, on a display device according to an instruction of the user inputted through an input device; a setting request data transmission unit which transmits the setting request data, representing the setting change instructions inputted by the user referring to the setting screen displayed on the display device by the setting screen display control unit, to the information processing device; and a test data transmission unit which transmits test data, to be used for judging whether communication between the management device and the information processing device can be performed normally or not, to the information processing device in response to the transmission of the setting request data by the setting request data transmission unit. The judgment unit of the information processing device is configured to judge whether the communication with the device as the sender of the setting request data can be performed normally via the communication unit or not based on reception status of the test data.

With the communication system configured as above, the setting change to the criterion of the communication unit according to the setting request data can be invalidated as needed based on the judgment by the judgment unit. Therefore, even if a user operating an external management device erroneously inputs the instructions to be contained in the setting request data and an erroneous setting change is made to the criterion of the communication unit of the information processing device according to the erroneous instructions, the information processing device can be prevented from becoming continuously incapable of accepting data from the management device, by which the user is prevented from becoming incapable of making settings of the information processing device from the management device via the network. Further, since the judgment on whether the communication can be performed normally or not is made based on the transmission and reception of the test data, the judgment can be made simply and properly.

Preferably, the information processing device in the communication system further comprises a setting restoration unit which restores the criterion set to the communication unit to that before the setting change by the setting change unit in response to the judgment unit judging that the communication with the device as the sender of the setting request data can not be performed normally via the communication unit.

With the communication system configured as above, the settings of the communication unit are restored to the original settings (settings before the setting change) if the communication with the device (sender of the setting request data) can not be performed normally via the communication unit due to a setting error by the user. Therefore, the user is prevented from becoming incapable of making settings of the information processing device from the management device via the network even if erroneous settings (erroneous instructions) are made by the user.

Preferably, the information processing device further comprises a restoration notification unit which transmits restoration notification data, indicating that the restoration by the setting restoration unit has been made, to the device as the sender of the setting request data via the communication unit in response to the restoration having been made by the setting restoration unit. The management device further comprises a restoration completion message display control unit which displays a message representing the reception of the restoration notification data from the information processing device on the display device upon reception of the restoration notification data.

With the communication system configured as above, the restoration notification data indicating that the settings have been restored to the original settings is transmitted to the management device (sender of the setting request data) and the user is informed of the restoration, by which the user is prevented from mistakenly recognizing that the settings (setting change) made according to the user's instructions are still valid even though the setting change has already been invalidated by the setting restoration unit.

Preferably, the information processing device further comprises: a nonvolatile storage device which stores the criterion to be set to the communication unit; a setting unit which sets the criterion stored in the nonvolatile storage device to the communication unit at the startup of the information processing device; and a regular setting unit which updates the criterion stored in the nonvolatile storage device to the criterion set by the setting change unit to the communication unit in response to the judgment unit judging that the communication with the device as the sender of the setting request data can be performed normally via the communication unit.

With the communication system configured as above, the setting change according to the setting request data (or the criterion currently employed by the communication unit after the setting change) is incorporated into the criterion stored in the nonvolatile storage device only if the communication with the device (sender of the setting request data) can be performed normally after the setting change according to the setting request data. Therefore, even when the user operating an external management device erroneously inputs the setting change instructions (to be contained in the setting request data) and an erroneous setting change to the criterion of the communication unit according to the erroneous instructions disables the communication between the information processing device and the management device via the communication unit, the user is allowed to make settings of the information processing device from the management device via the network again only by restarting the information processing device.

Preferably, the information processing device further comprises a regular setting notification unit which transmits regular setting notification data, indicating that the update by the regular setting unit has been made, to the device as the sender of the setting request data via the communication unit in response to the update having been made by the regular setting unit. The management device further comprises a regular setting completion message display control unit which displays a message representing the reception of the regular setting notification data from the information processing device on the display device upon reception of the regular setting notification data.

With the communication system configured as above, the user is informed via the management device (sender of the setting request data) that the regular setting (update) has been made by the regular setting unit of the information processing device, by which the user is saved from feeling anxious about whether the settings (setting change) made by the user are valid in the information processing device or not.

Preferably, the judgment unit of the information processing device is configured to judge that the communication with the device as the sender of the setting request data can be performed normally via the communication unit in response to the test data being received from the device via the communication unit within a prescribed time period from the setting change by the setting change unit, while judging that the communication with the device can not be performed normally via the communication unit in response to the test data can not being received from the device via the communication unit within the prescribed time period.

With the communication system configured as above, the settings (setting change) according to the setting request data can be invalidated if the information processing device after the setting change can not receive the test data from the management device (sender of the setting request data). Therefore, even when the communication unit has the filtering function, the disablement of subsequent settings to the information processing device via the network due to a setting error by the user can be avoided.

The management device further comprises a confirmation screen display control unit which displays a confirmation screen, for receiving a regular setting instruction from the user, on the display device in response to the transmission of the setting request data by the setting request data transmission unit. The test data transmission unit of the management device is configured to transmit the test data to the information processing device in response to the regular setting instruction being inputted by the user through the input device according to the confirmation screen displayed on the display device by the confirmation screen display control unit.

With the communication system configured as above, the user can cancel the setting change by not inputting the regular setting instruction to the confirmation screen and intentionally stopping the transmission of the test data. Thus, the communication system allows the user to make the cancellation of the setting change with ease. Further, since the test data for regularly validating the setting change is transmitted in response to the input of the regular setting instruction by the user, the user is saved from feeling anxious about whether the settings (setting change) made by the user are valid in the information processing device or not.

Preferably, the information processing device further comprises a setting change notification unit which transmits setting change notification data, indicating that the setting change by the setting change unit has been made, to the device as the sender of the setting request data via the communication unit in response to the setting change having been made by the setting change unit. The confirmation screen display control unit of the management device is configured to display the confirmation screen on the display device in response to the setting change notification data being received from the information processing device.

With the communication system configured as above, the displaying of the confirmation screen can be executed securely after the setting change by the setting change unit, by which a sequence error between the setting change by the setting change unit and the transmission of the test data can be eliminated with a simple configuration.

In accordance with another aspect of the present invention, there is provided a management device for communicating with and managing an information processing device (which comprises a communication unit communicating with each device on a network, determining whether to accept data received from a device on the network or not based on a prescribed criterion, and transferring the received data to the inside of the information processing device in response to the received data being determined to be accepted based on the prescribed criterion and a setting change unit making a setting change to the prescribed criterion according to setting request data in response to receipt of the setting request data from a device on the network via the communication unit). The management device comprises: a setting screen display control unit which displays a setting screen, for receiving setting change instructions regarding the criterion from a user, on a display device according to an instruction of the user inputted through an input device; a setting request data transmission unit which transmits the setting request data, representing the setting change instructions inputted by the user referring to the setting screen displayed on the display device by the setting screen display control unit, to the information processing device; and a setting change appropriateness judgment unit which judges whether the setting change of the criterion made by the setting change unit of the information processing device according to the setting change instructions inputted by the user disables the information processing device from accepting data from the management device via the communication unit or not before the transmission of the setting request data by the setting request data transmission unit.

In at least one aspect, the management device further comprises and a setting prohibition unit which prohibits the transmission of the setting request data by the setting request data transmission unit in response to the setting change appropriateness judgment unit judging that the setting change of the criterion according to the setting change instructions disables the information processing device from accepting data from the management device via the communication unit.

With the management device configured as above, if the setting change instructions inputted by the user are inappropriate (disabling the information processing device from accepting data from the management device via the communication unit), the setting change instructions are invalidated by prohibiting the transmission of the setting request data representing the instructions. Therefore, even when erroneous setting change instructions are inputted by the user, the information processing device is prevented from becoming incapable of accepting data from the management device due to an erroneous setting change according to the erroneous instructions, by which the disablement of the user's settings to the information processing device from the management device via the network can be avoided.

In accordance with another aspect of the present invention, there is provided a management device comprising a warning message display control unit instead of the setting prohibition unit of the above management device. The warning message display control unit displays a warning message on the display device in response to the setting change appropriateness judgment unit judging that the setting change of the criterion according to the setting change instructions disables the information processing device from accepting data from the management device via the communication unit.

With the management device configured as above, if the setting change instructions by the user are inappropriate, the user is prompted by the warning message to recheck the instructions. Therefore, an erroneous setting change according to the inappropriate instructions and resultant disablement of the information processing device's data acceptance from the management device can be prevented, by which the disablement of the user's settings to the information processing device from the management device via the network can be avoided.

Incidentally, the convenience of the management device can be enhanced by further providing the management device with a setting prohibition unit which prohibits the transmission of the setting request data by the setting request data transmission unit in response to an instruction of the user inputted through the input device after the displaying of the warning message. If the warning message is merely displayed on the display device and the transmission of the setting request data is carried out with the inappropriate instructions, that leads to problems as in conventional communication systems unless the communication system is configured employing the above information processing device, and the warning message in this case can serve at most for preventing recurrence of the same setting error. On the other hand, by prohibiting the transmission of the setting request data by the setting request data transmission unit as needed according to an instruction of the user inputted through the input device after the displaying of the warning message, an erroneous setting change according to inappropriate instructions by the user can basically be avoided, by which the information processing device is prevented from becoming incapable of accepting data from the management device with higher reliability.

In accordance with another aspect of the present invention, there is provided a computer program product comprising computer-readable instructions that cause a computer (capable of communicating with an information processing device including a communication unit communicating with each device on a network, determining whether to accept data received from a device on the network or not based on a prescribed criterion, and transferring the received data to the inside of the information processing device in response to the received data being determined to be accepted based on the prescribed criterion and a setting change unit making a setting change to the prescribed criterion according to setting request data in response to receipt of the setting request data from a device on the network via the communication unit) to function as: a setting screen display control unit which displays a setting screen, for receiving setting change instructions regarding the criterion from a user, on a display device according to an instruction of the user inputted through an input device; a setting request data transmission unit which transmits the setting request data, representing the setting change instructions inputted by the user referring to the setting screen displayed on the display device by the setting screen display control unit, to the information processing device; and a setting change appropriateness judgment unit which judges whether the setting change of the criterion made by the setting change unit of the information processing device according to the setting change instructions inputted by the user disables the information processing device from accepting data from the computer via the communication unit or not before the transmission of the setting request data by the setting request data transmission unit.

In at least one aspect, the instructions further cause the computer to function as a setting prohibition unit which prohibits the transmission of the setting request data by the setting request data transmission unit in response to the setting change appropriateness judgment unit judging that the setting change of the criterion according to the setting change instructions disables the information processing device from accepting data from the computer via the communication unit.

With the computer program product configured as above, the disablement of the information processing device's data acceptance from the management device and the user's subsequent settings to the information processing device via the network (due to a setting change according to inappropriate instructions by the user) can be avoided.

In accordance with another aspect of the present invention, there is provided a computer program product comprising computer-readable instructions that cause a computer (capable of communicating with an information processing device including a communication unit communicating with each device on a network, determining whether to accept data received from a device on the network or not based on a prescribed criterion, and transferring the received data to the inside of the information processing device in response to the received data being determined to be accepted based on the prescribed criterion and a setting change unit making a setting change to the prescribed criterion according to setting request data in response to receipt of the setting request data from a device on the network via the communication unit) to function as: a setting screen display control unit which displays a setting screen, for receiving setting change instructions regarding the criterion from a user, on a display device according to an instruction of the user inputted through an input device; a setting request data transmission unit which transmits the setting request data, representing the setting change instructions inputted by the user referring to the setting screen displayed on the display device by the setting screen display control unit, to the information processing device; and a setting change appropriateness judgment unit which judges whether the setting change of the criterion made by the setting change unit of the information processing device according to the setting change instructions inputted by the user disables the information processing device from accepting data from the computer via the communication unit or not before the transmission of the setting request data by the setting request data transmission unit.

In at least one aspect, the instructions further cause the computer to function as a warning message display control unit which displays a warning message on the display device in response to the setting change appropriateness judgment unit judging that the setting change of the criterion according to the setting change instructions disables the information processing device from accepting data from the computer via the communication unit.

With the computer program product configured as above, if the setting change instructions by the user are inappropriate, the user is prompted by the warning message to recheck the instructions. Therefore, an erroneous setting change according to the inappropriate instructions and resultant disablement of the information processing device's data acceptance from the management device can be prevented, by which the disablement of the user's settings to the information processing device from the management device via the network can be avoided.

According to another aspect of the invention, there is provided a method for setting change to be implemented on a computer, provided with a communication unit communicating with each device on a network, determining whether to accept data received from a device on the network or not based on a prescribed criterion, and transferring the received data to the inside of the computer in response to the received data being determined to be accepted based on the prescribed criterion. The method comprises the steps of: making a setting change to the prescribed criterion of the communication unit according to instructions represented by setting request data in response to receipt of the setting request data requesting for the setting change of the criterion from a device on the network via the communication unit; and judging whether the communication with the device as the sender of the setting request data can be performed normally via the communication unit or not in response to the setting change according to the setting request data.

With this configuration, the setting change according to the setting request data can be invalidated as needed based on the judgment by the judgment unit. Therefore, even when a user operating a management device erroneously inputs the instructions to be contained in the setting request data and an erroneous setting change is made to the criterion according to the erroneous instructions, the computer can be prevented from becoming continuously incapable of accepting data from the management device, by which the user is prevented from becoming incapable of making settings of the computer (the criterion, etc) from the management device via the network.

ILLUSTRATIVE EXAMPLES

Referring now to the drawings, a description will be given in detail of preferred examples.

First Example

FIG. 1 is a block diagram showing the composition of a communication system 1 in accordance with a first example. As shown in FIG. 1, the communication system 1 of the first example comprises a gateway 3 connected to a WAN (Wide Area Network), a plurality of printers 10, and a plurality of PCs (Personal Computers) 30. Each printer 10 or PC 30 is configured to be capable of TCP/IP communication, by which a LAN (Local Area Network) including the printers 10 and PCs 30 is formed in the communication system 1.

Each printer 10 comprises a CPU (Central Processing Unit) 11 which controls components of the printer 10 by executing various programs, a ROM (Read Only Memory) 13 which stores the various programs to be executed by the CPU 11, a RAM (Random Access Memory) 15 which is used as work areas during the execution of the programs by the CPU 11, an NVRAM (NonVolatile RAM) 17 as a rewritable nonvolatile memory for storing various setting data, a printing unit 21 which forms (prints) an image on a print medium (e.g. paper) under the control of the CPU 11, a display/operation unit 23 including a display unit (LCD monitor) and an operation unit (keys) to be operated by the user, a communication control unit 25 which executes communication control according to TCP/IP and thereby enables the printer 10 to perform TCP/IP communication, and a network I/F (interface) 27 (so-called "LAN interface") which is connected to the LAN.

Each PC 30 comprises a CPU 31 which controls components of the PC 30 by executing various programs, a ROM 33 which stores the various programs (e.g. boot program) to be executed by the CPU 31, a RAM 35 which is used as work areas during the execution of the programs by the CPU 31, an HDD (Hard Disk Drive) 37 which stores programs (operating system, application programs, etc.) and various data, a display unit 41 (LCD monitor, etc.) for displaying information, an input unit 43 (keyboard, pointing device, etc.) to be operated by the user for inputting instructions, data, etc., a communication control unit 45 which executes communication control according to TCP/IP and thereby enables the PC 30 to perform TCP/IP communication, and a network I/F 47 (so-called "LAN interface") which is connected to the LAN.

Incidentally, while the communication control unit 25 (communication control unit 45) and the CPU 11 (CPU 31) are shown separately in FIG. 1, the communication control unit 25 (communication control unit 45) may either be implemented by a special-purpose device (e.g. special-purpose microcomputer) or by letting the CPU 11 (CPU 31) execute programs or software (protocol stack) for realizing TCP/IP communication. In this example, processes executed by the communication control unit 25 (communication control unit 45) are assumed to be implemented by programs.

Figure 2:
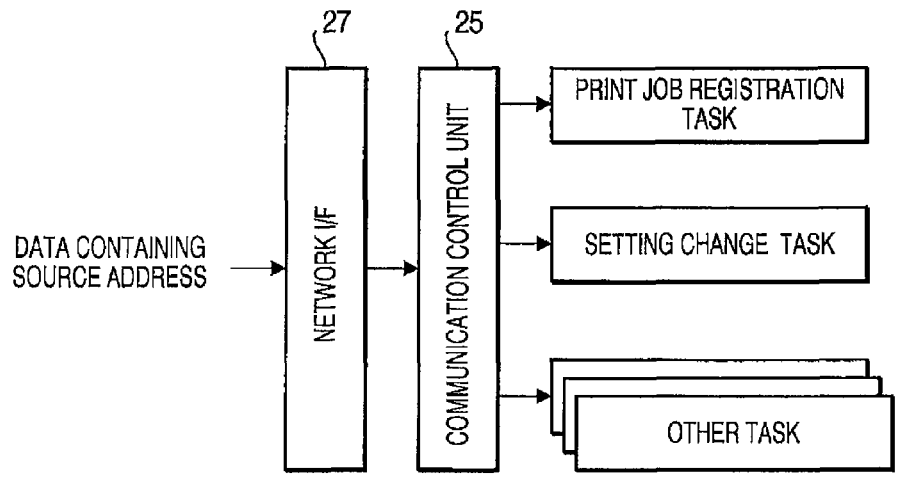
FIG. 2 is an explanatory drawing showing a data receiving operation of a communication control unit of a printer included in the communication system of FIG. 1.

In this example, each printer 10 is configured so that each "task" for communicating with a device (e.g. PC 30) on the LAN and implementing a prescribed function (e.g. network print function) can be executed by the CPU 11. In the printer 10, the communication control unit 25 relays data to be communicated between such a task and a device (e.g. PC 30) on the LAN. FIG. 2 is an explanatory drawing showing an operation (data receiving operation) of the communication control unit 25 of the printer 10.

The communication control unit 25 converts transmit data generated by the task into data in the TCP/IP format (so-called "IP packet") by performing a prescribed process (e.g. adding an IP address assigned to the printer 10 to the transmit data as the source address), and outputs the converted transmit data to the network I/F 27. The network I/F 27 converts the transmit data from the communication control unit 25 into an electric signal suitable for the LAN and transmits the electric signal to the LAN, while receiving an electric signal from the LAN, converting the received electric signal into digital data that can be received by the communication control unit 25, and storing the digital data in its own buffer.

The communication control unit 25 reads out the received data from the buffer of the network I/F 27, determines a task to which the received data should be handed over (transferred) based on information contained in the received data (e.g. port number), and supplies (transfers) the received data to the determined task.

For example, when the port number contained in the received data is a port number for network printing, the communication control unit 25 supplies the received data to a "print job registration task". The print job registration task is a task for communicating with a PC 30 via the communication control unit 25 and the network I/F 27, receiving print instruction data transmitted from the PC 30, and registering a print job (regarding print data contained in the print instruction data) in a queue. The print job registered in the queue is processed by a "print control task". Specifically, each print job registered in the queue is processed by the print control task in the first-in first-out manner, by which an image according to the print data is printed out by the printing unit 21.

When the port number contained in the received data is a port number for a setting change, the communication control unit 25 supplies the received data to a "setting change task". The setting change task is a task for communicating with a PC 30 via the communication control unit 25 and the network I/F 27, receiving setting request data (generated by the PC 30 according to inputs to the PC 30 by a user) transmitted from the PC 30, and making a setting change regarding a filtering function of the printer 10 by updating its own operation parameters and filtering setting data stored in the NVRAM 17 according to the received setting request data.

The communication control unit 25 in this example has the aforementioned filtering function. When the filtering function has been set ON, the communication control unit 25 supplies (transfers) the received data to a corresponding task only when a prescribed IP address is contained in the received data as the source address. When a different IP address is contained in the received data as the source address, the communication control unit 25 does not supply (transfer) the received data to the corresponding task. Since information on an IP address of the sender (source) of an IP packet is attached to the IP packet in IP communication as is generally known, the communication control unit 25 carries out the above data transfer control based on the source address information.

Figure 3:
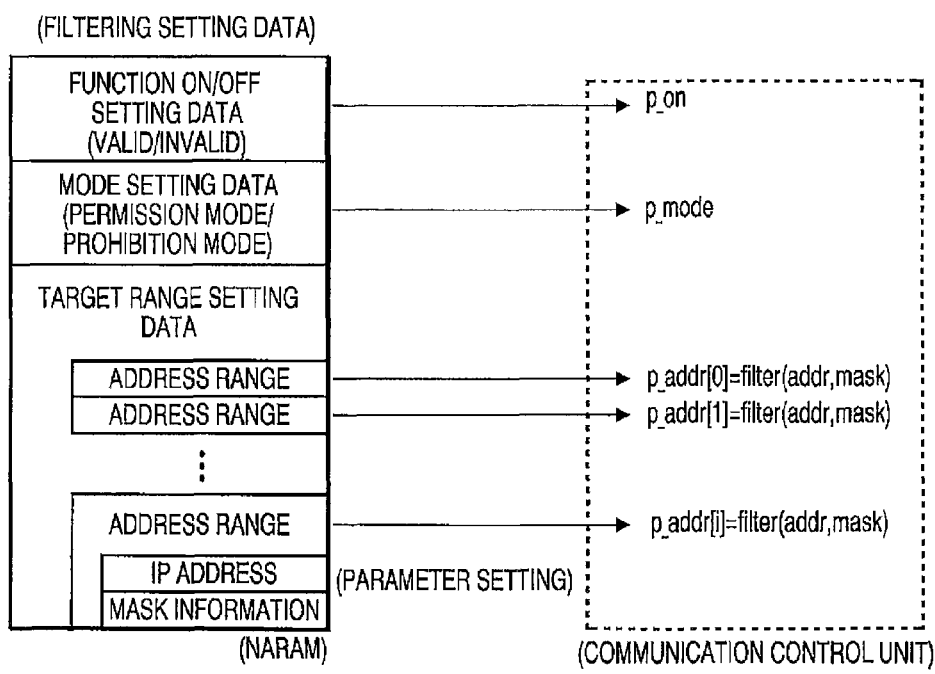
FIG. 3 is an explanatory drawing showing data structure of filtering setting data.

FIG. 3 is an explanatory drawing showing data structure of the filtering setting data stored in the NVRAM 17 of the printer 10. The filtering setting data, as data specifying the operation of the filtering function, comprises function ON/OFF setting data, mode setting data and target range setting data.

The function ON/OFF setting data, representing "valid" or "invalid", is data which is used for setting the filtering function ON or OFF. At the startup, the communication control unit 25 sets a corresponding operation parameter (hereinafter referred to as a "parameter p_on") at the value represented by the function ON/OFF setting data (comprised in the filtering setting data stored in the NVRAM 17), by which the filtering function is set ON/OFF if the function ON/OFF setting data represents valid/invalid.

The mode setting data is data representing a filtering mode ("permission mode" or "prohibition mode"). At the startup, the communication control unit 25 sets a corresponding operation parameter (hereinafter referred to as a "parameter p_mode") at the value represented by the mode setting data.

When the parameter p_mode represents the "permission mode", the communication control unit 25 judges that the received data is acceptable and supplies (transfers) the received data to a corresponding task if the received data is from an intended device having an IP address (source IP address) within an address range (permitting address range) represented by an operation parameter corresponding to the target range setting data, while judging that the received data is unacceptable and discarding the received data without supplying (transferring) it to the corresponding task if the received data is from an unintended device having an IP address (source IP address) outside the permitting address range.

On the other hand, when the parameter p_mode represents the "prohibition mode", the communication control unit 25 judges that the received data is unacceptable and discards the received data without supplying (transferring) it to the corresponding task if the received data is from an unintended device having an IP address (source IP address) within an address range (prohibiting address range) represented by the operation parameter corresponding to the target range setting data, while judging that the received data is acceptable and supplying (transferring) the received data to the corresponding task if the received data is from an intended device having an IP address (source IP address) outside the prohibiting address range.

The target range setting data is data representing at least one IP address range (address range) as the target of the filtering. The address range is described by IP address information and mask information (representing valid address digits). For example, when the IP address information is "10. 134. 0. 0" and the mask information is "255. 255. 0. 0", IP addresses having higher-order 16 bits of "10. 134" are regarded as the target of the filtering.

Incidentally, at the startup of the communication control unit 25, a pair of operation parameters of the communication control unit 25 corresponding to the target range setting data (hereinafter referred to as "parameters p_addr") are set at the pair of address range values (the above IP address and mask value) in response to the target range setting data. After the startup, the communication control unit 25 performs the filtering of received data based on the parameters p_addr.

Figure 4:
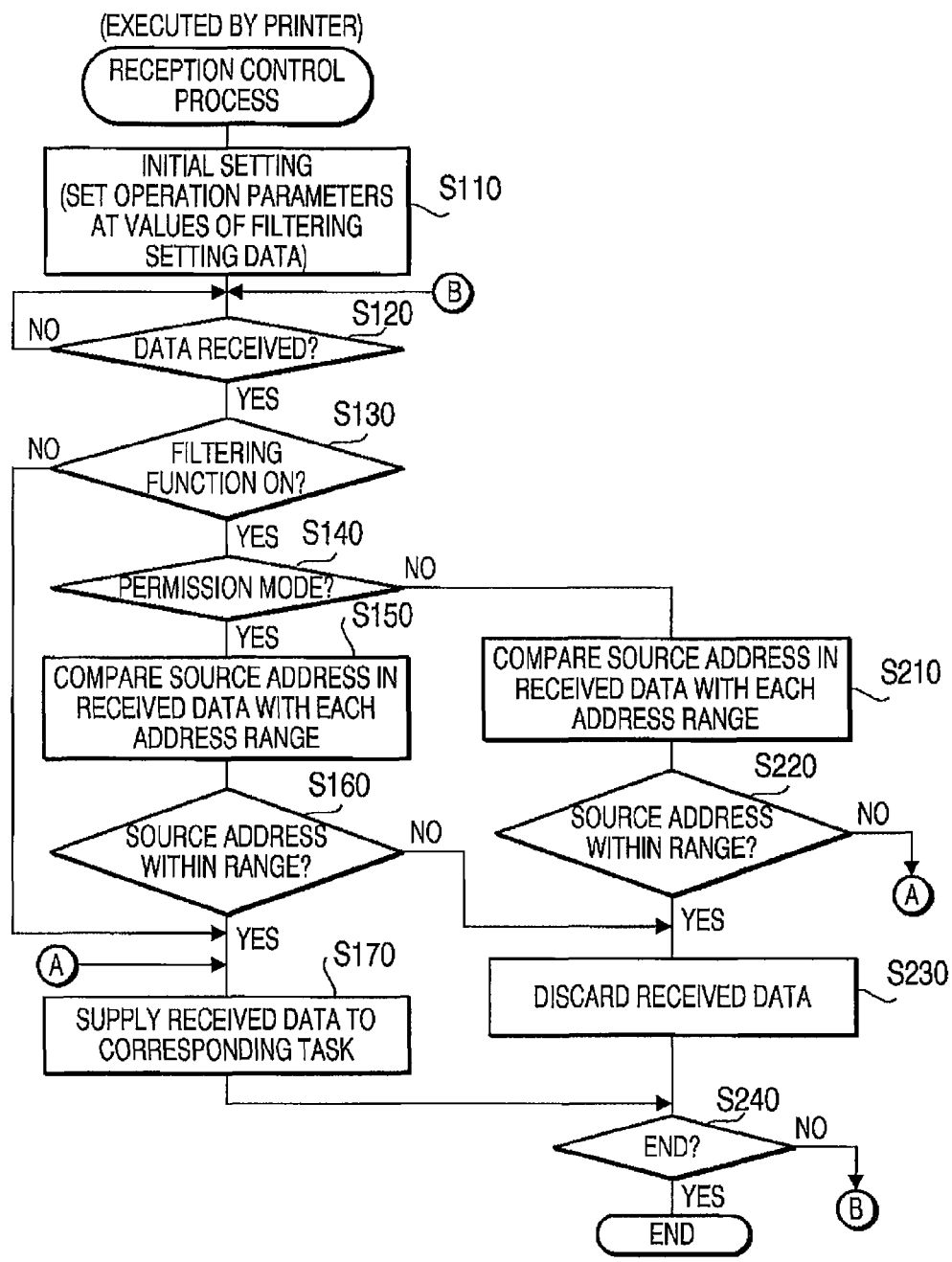
FIG. 4 is a flow chart showing a reception control process which is executed by the communication control unit of the printer.

Next, a reception control process which is executed by the communication control unit 25 of the printer 10 will be explained below. FIG. 4 is a flow chart showing the reception control process which is started by the communication control unit 25 immediately after startup (turning ON) of the printer 10. The aforementioned filtering function is implemented by this reception control process.

At the start of the reception control process, the communication control unit 25 sets the aforementioned operation parameters specifying the reception control operation (makes the initial setting) based on the filtering setting data stored in the NVRAM 17 (S110). Specifically, the parameter peon is set at the value represented by the function ON/OFF setting data (comprised in the filtering setting data), the parameter p_mode is set at the value represented by the mode setting data, and the parameters p_addr are set at the address range values (IP address, mask value) represented by the target range setting data.

After making the initial setting, the communication control unit 25 waits until the network I/F 27 receives data (IP packet) from a device on the LAN (S120). When data is received by the network I/F 27 (S120: YES), the communication control unit 25 judges whether the filtering function is ON or OFF based on the parameter p_on (S130). Specifically, the filtering function is judged to be ON when the parameter p_on represents "valid", and OFF when the parameter p_on represents "invalid".

If the filtering function is judged to be OFF (S130: NO), the communication control unit 25 unconditionally accepts the data received by the network I/F 27 and supplies (transfers) the received data to a task corresponding to the port number contained in the received data (S170). Thereafter, the process advances to step S240, in which the communication control unit 25 judges whether or not an ending instruction has been inputted from outside. If no ending instruction has been inputted (S240: NO), the process returns to the step S120. If the ending instruction has been inputted by a shutdown operation by the user, etc. (S240: YES), the reception control process of FIG. 4 is ended.

In the step S130, if the filtering function is judged to be ON (S130: YES), the communication control unit 25 judges whether the parameter p_mode represents the "permission mode" or not (S140). If the parameter p_mode represents the "permission mode" (S140: YES), the process advances to step S150. On the other hand, if the parameter p_mode represents the "prohibition mode" (S140: NO), the process advances to step S210.

In the step S150, the communication control unit 25 compares the source address contained in the received data with each address range (in response to the address range values (IP address, mask value)) represented by the parameters p_addr. Based on the comparison, the communication control unit 25 judges whether or not the source address is within any one of the address ranges represented by the parameters p_addr (S160).

If the source address contained in the received data is within one of the address ranges represented by the parameters p_addr (S160: YES), the communication control unit 25 accepts the received data and supplies (transfers) the received data to the corresponding task (S170). Thereafter, the process advances to the step S240.

On the other hand, if the source address is within none of the address ranges represented by the parameters p_addr (S160: NO), the communication control unit 25 discards the received data without supplying (transferring) it to the corresponding task (S230). Thereafter, the process advances to the step S240.

In the step S210 (executed when the parameter p_mode represents the "prohibition mode" in the step S140), the communication control unit 25 compares the source address contained in the received data with each address range (in response to the address range values (IP address, mask value)) represented by the parameters p_addr. Based on the comparison, the communication control unit 25 judges whether or not the source address is within any one of the address ranges represented by the parameters p_addr (S220).

If the source address contained in the received data is within one of the address ranges represented by the parameters p_addr (S220: YES), the communication control unit 25 discards the received data without supplying (transferring) it to the corresponding task (S230). Thereafter, the process advances to the step S240.

On the other hand, if the source address is within none of the address ranges represented by the parameters p_addr (S220: NO), the communication control unit 25 accepts the received data and supplies (transfers) the received data to the corresponding task (S170). Thereafter, the process advances to the step S240. In the step S240, the reception control process of FIG. 4 is ended if the ending instruction has been inputted (S240: YES). The filtering function is implemented as explained above.

Figure 5:
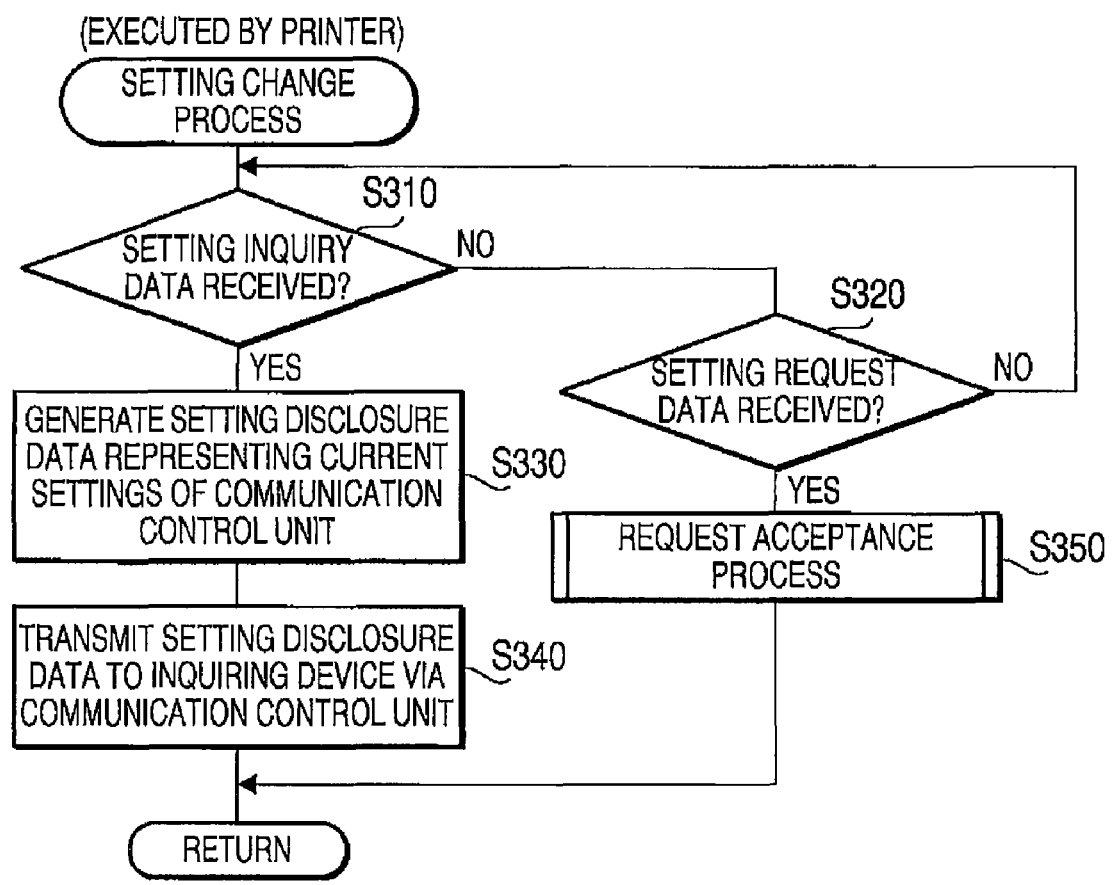
FIG. 5 is a flow chart showing a setting change process which is executed by a CPU of the printer.

FIG. 5 is a flow chart showing a setting change process which is executed repeatedly by the CPU 11 of the printer 10 as the aforementioned setting change task.

At the start of the setting change process, the CPU 11 waits until setting inquiry data or the setting request data is received from a device (PC 30) on the LAN via the communication control unit 25 (S310, S320). When the setting inquiry data is received (S310: YES), the CPU 11 generates "setting disclosure data" representing the current settings of the communication control unit 25 (the settings regarding the ON/OFF of the filtering function, the filtering mode, and the address ranges) by referring to the operation parameters which have been set to the communication control unit 25 (S330), and transmits the setting disclosure data to the device (sender of the setting inquiry data) via the communication control unit 25 (S340). Thereafter, the process returns to the step S310.

When the setting request data is received from a device (PC 30) on the LAN via the communication control unit 25 (S320: YES), the CPU 11 executes a request acceptance process shown in FIG. 6 (S350), by which the operation parameters of the communication control unit 25 and the filtering setting data stored in the NVRAM 17 are updated according to instructions represented by the received setting request data.

Incidentally, the setting request data is generated by the device (the PC 30 as the sender of the setting request data) according to setting operations by a user. Specifically, the setting request data contains provisional setting necessity data (representing whether "provisional setting" is necessary or not), function ON/OFF setting data, mode setting data and target range setting data. The communication control unit 25 makes the setting change according to the instructions, by updating its own operation parameters and the filtering setting data stored in the NVRAM 17 according to the data listed above.

Figure 6:
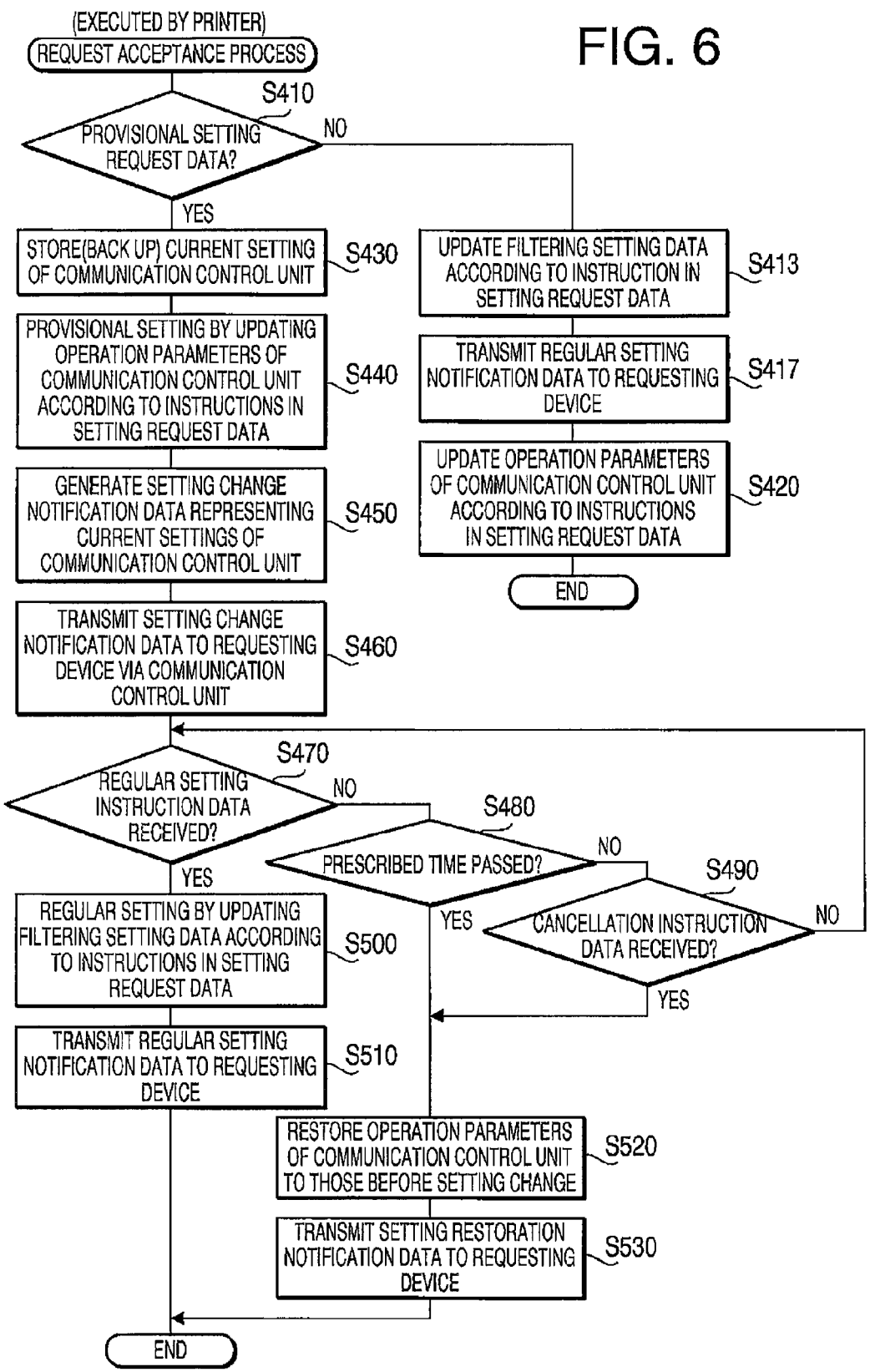
FIG. 6 is a flow chart showing a request acceptance process which is executed by the CPU of the printer.

FIG. 6 is a flow chart showing the request acceptance process executed by the CPU 11 of the printer 10 in the step S350 of the setting change process. At the start of the request acceptance process, the CPU 11 judges whether the received setting request data is provisional setting request data or regular setting request data by checking whether or not the provisional setting necessity data contained in the setting request data indicates that the provisional setting is necessary (S410).

If the provisional setting necessity data indicates that the provisional setting is unnecessary, the CPU 11 judges that the received setting request data is not provisional setting request data but regular setting request data (S410: NO). In this case, the CPU 11 updates the filtering setting data stored in the NVRAM 17 according to the instructions represented by the received setting request data (S413). Specifically, the CPU 11 updates each piece of data (function ON/OFF setting data, mode setting data, target range setting data) comprised in the filtering setting data to a value represented by corresponding data contained in the setting request data. After updating the filtering setting data (S413), the CPU 11 transmits "regular setting notification data" (representing the completion of the regular setting and each value of the updated filtering setting data stored in the NVRAM 17) to the device (PC) as the sender of the setting request data (S417).

Subsequently, the CPU 11 updates the operation parameters of the communication control unit 25 according to the instructions represented by the received setting request data (S420). Specifically, the CPU 11 updates the parameter p_on to a value represented by the function ON/OFF setting data (comprised in the setting request data), updates the parameter p_mode to a value represented by the mode setting data, and updates the parameters p_addr to values (indicating the address ranges) represented by the target range setting data. Incidentally, the parameter update is made while the communication control unit 25 returns from S240 to S120 of the reception control process of FIG. 4, for example. After finishing the step S420, the request acceptance process of FIG. 6 is ended.

On the other hand, if the provisional setting necessity data contained in the setting request data indicates that the provisional setting is necessary, the CPU 11 judges that the received setting request data is provisional setting request data (S410: YES). In this case, the CPU 11 temporarily stores current values of the operation parameters of the communication control unit 25 in the RAM 15, that is, makes a backup of the current operation parameters of the communication control unit 25 (S430).

After making the backup (S430), the CPU 11 makes a provisional setting of the filtering function by updating the operation parameters of the communication control unit 25 according to the instructions represented by the received setting request data similarly to the step S420 (S440). After making the provisional setting (S440), the CPU 11 generates "setting change notification data" representing the completion of the provisional setting and the current settings of the communication control unit 25 (the settings regarding the ON/OFF of the filtering function, the filtering mode, and the address ranges) (S450) and transmits the setting change notification data to the device (the PC 30 as the sender of the setting request data) via the communication control unit 25 (S460).

Incidentally, while details will be explained later, the sender of the setting request data (PC 30) receiving the setting change notification data from the printer 10 displays a regular setting confirmation screen shown in FIG. 10B and inquires of the user whether or not to make the regular setting according to the provisional setting. When the user presses a setting key ("SET" key) to make the regular setting, the device (PC 30) transmits "regular setting instruction data" to the printer 10. On the other hand, when the user presses a cancel key to cancel the regular setting, the device (PC 30) transmits "cancellation instruction data" to the printer 10. Therefore, the CPU 11 after transmitting the setting change notification data (S460) waits until the regular setting instruction data or the cancellation instruction data is received via the communication control unit 25 (S470-S490).

However, if the communication control unit 25 starts discarding data received from the sender of the setting request data due to a setting change of its own operation parameters according to setting request data, the CPU 11 can not recognize the reception of the regular setting instruction data or cancellation instruction data in the request acceptance process even when the data is actually received by the network I/F 27. To avoid the problem, the CPU 11 also executes a timeout process in S470-S490.

Specifically, the CPU 11 after transmitting the setting change notification data (S460) judges whether or not the regular setting instruction data has been received from the sender of the setting request data via the communication control unit 25 (S470). If no regular setting instruction data has been received (S470: NO), the CPU 11 judges whether or not a prescribed time period has passed since the transmission of the setting change notification data (S480). If the prescribed time period has not passed yet (S480: NO), the CPU 11 judges whether or not the cancellation instruction data has been received from the sender of the setting request data via the communication control unit 25 (S490). If no cancellation instruction data has been received (S490: NO), the CPU 11 returns to the step S470. By the above timeout process, the CPU 11 waits until the regular setting instruction data or the cancellation instruction data is received via the communication control unit 25 or the prescribed time period passes.

If the regular setting instruction data has been received from the sender of the setting request data via the communication control unit 25 (S470: YES), the CPU 11 makes the regular setting by updating the filtering setting data stored in the NVRAM 17 according to the instructions represented by the setting request data received prior to the regular setting instruction data (or according to the current settings of the communication control unit 25) (S500). After making the regular setting (S500), the CPU 11 transmits the regular setting notification data (representing the completion of the regular setting and each value of the updated filtering setting data stored in the NVRAM 17) to the sender of the setting request data (S510), and ends the request acceptance process of FIG. 6.

On the other hand, if the prescribed time period has passed since the transmission of the setting change notification data without receiving the regular setting instruction data nor the cancellation instruction data (S480: YES) or if the cancellation instruction data (transmitted from the sender of the setting request data when the cancel key on the regular setting confirmation screen is pressed by the user) is received via the communication control unit 25 within the prescribed time period (S490: YES), the CPU 11 restores the values of the operation parameters of the communication control unit 25 to those before the update of S440 based on the values backed up in S430 (S520).

By the step S520, the provisional setting which has been made in S440 is invalidated. Thereafter, the CPU 11 transmits "setting restoration notification data" (indicating the completion of the setting restoration and the current settings of the communication control unit 25) to the sender of the setting request data (S530) and ends the request acceptance process of FIG. 6. After finishing the request acceptance process (S350 in FIG. 5), the CPU 11 returns to the step S310 of the setting change process of FIG. 5.

Figure 7:
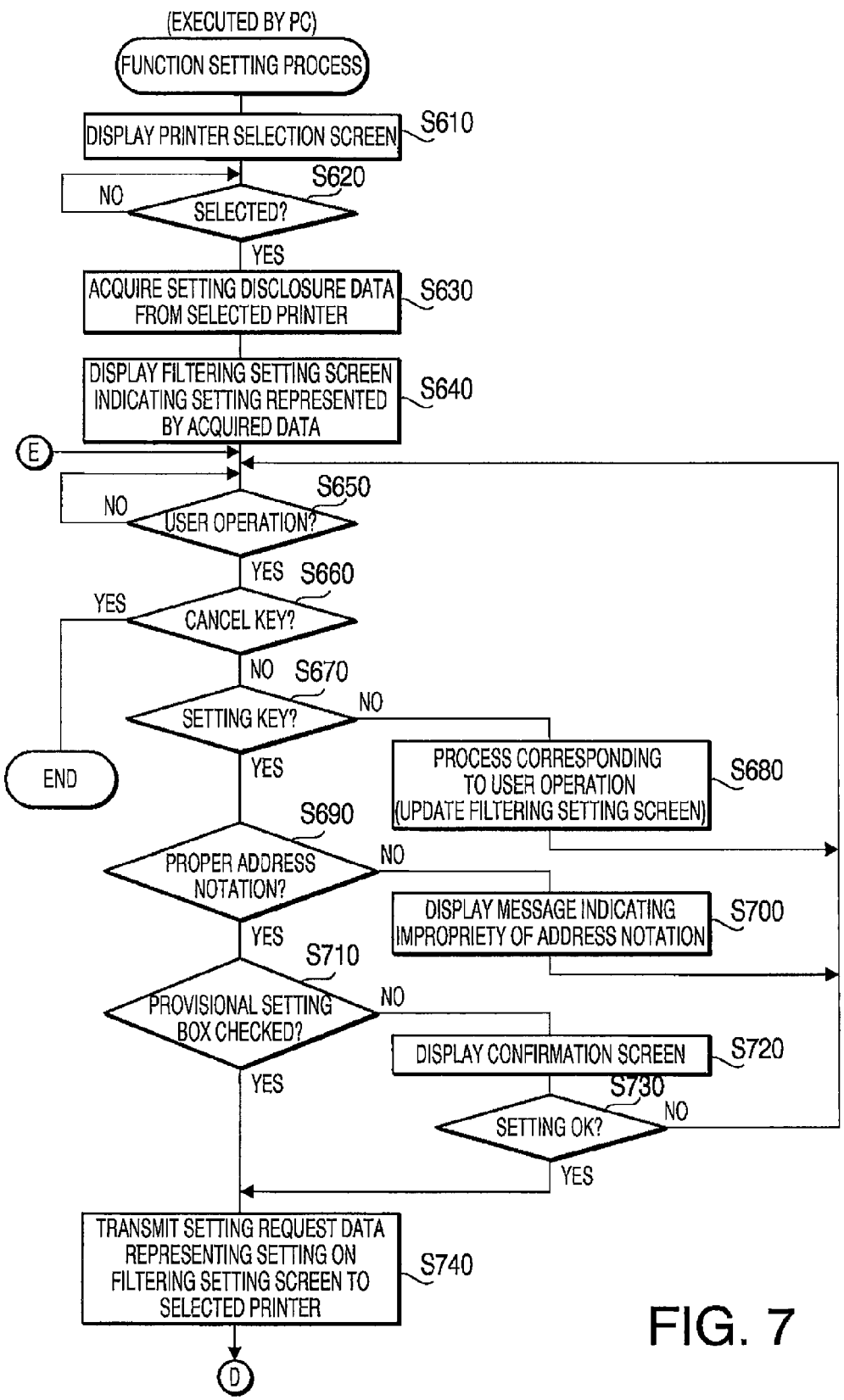
FIGS. 7 and 8 are flow charts showing a function setting process which is executed by a CPU of a PC included in the communication system of FIG. 1.
Figure 8:
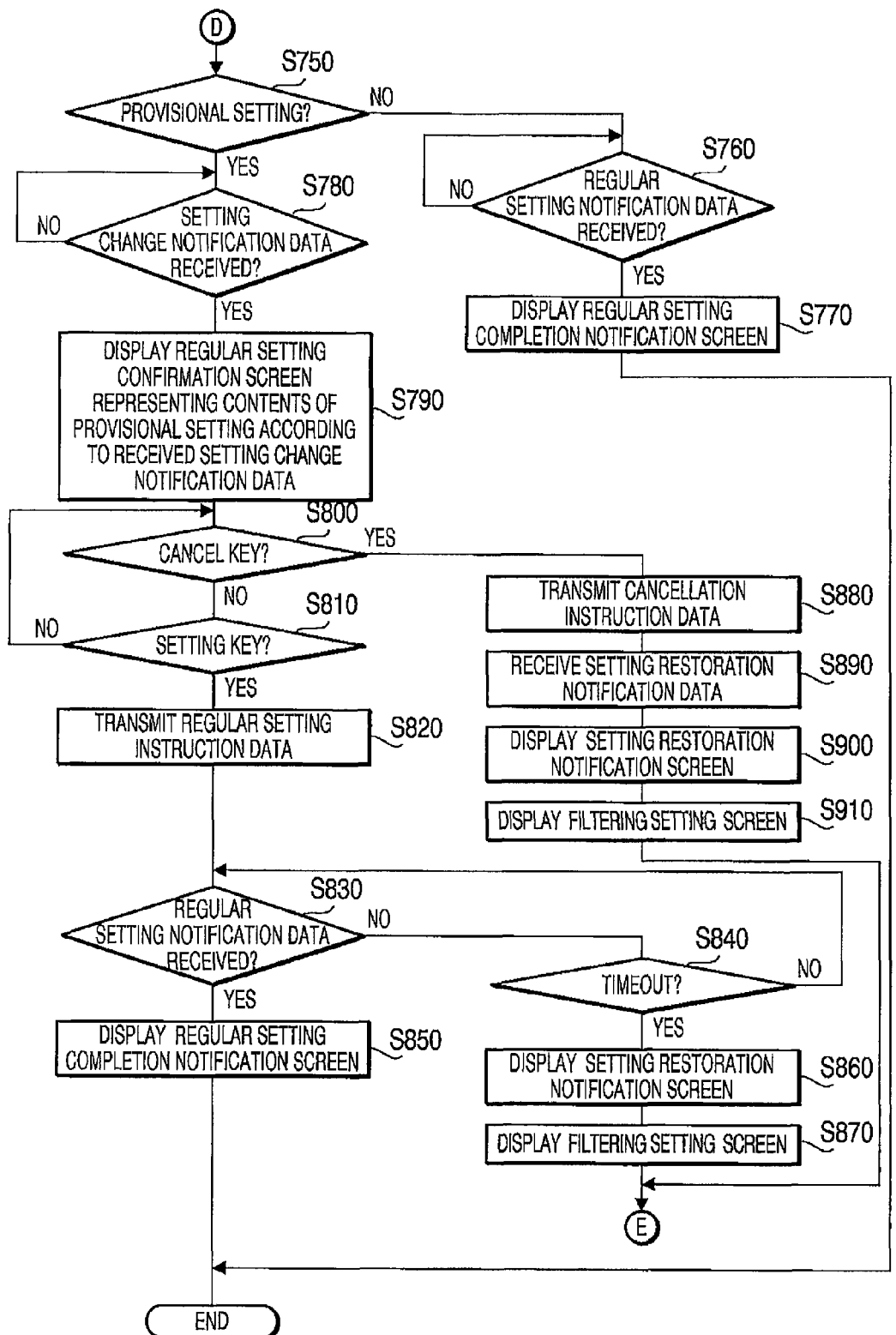

Some of the PCs 30 forming the communication system 1 have a function setting program (for letting the CPU 31 execute a function setting process shown in FIG. 7) in the HDD 37. By executing the function setting program, such a PC 30 transmits the aforementioned setting inquiry data or setting request data to a printer 10 according to instructions of the user. FIGS. 7 and 8 are flow charts showing the function setting process executed by the CPU 31 of a PC 30 in response to a function setting program execution instruction inputted by the user through the input unit 43.

At the start of the function setting process, the CPU 31 searches for printers 10 existing on the LAN by a well-known method (e.g. broadcasting search data and receiving response data) and thereby displays a printer selection screen, as a GUI (Graphical User Interface) showing a list of the printers 10 existing on the LAN, on the display unit 41 (S610). Subsequently, the CPU 31 checks whether or not one of the printers 10 existing on the LAN has been selected by the user from the printer selection screen by a prescribed selecting operation (S620).

If no printer 10 has been selected (S620: NO), the CPU 31 waits until one of the printers 10 is selected by the user. When a printer 10 is selected (S620: YES), the CPU 31 transmits the setting inquiry data to the selected printer 10 via the communication control unit 45, by which the CPU 31 acquires (receives) the setting disclosure data from the printer 10 via the communication control unit 45 (S630).

Upon reception of the setting disclosure data from the printer 10, the CPU 31 displays a filtering setting screen, as a GUI indicating the current settings of the printer 10 (filtering function) and being capable of receiving a setting change instruction regarding the filtering function from the user, on the display unit 41 based on the setting disclosure data (S640).

Figure 9:
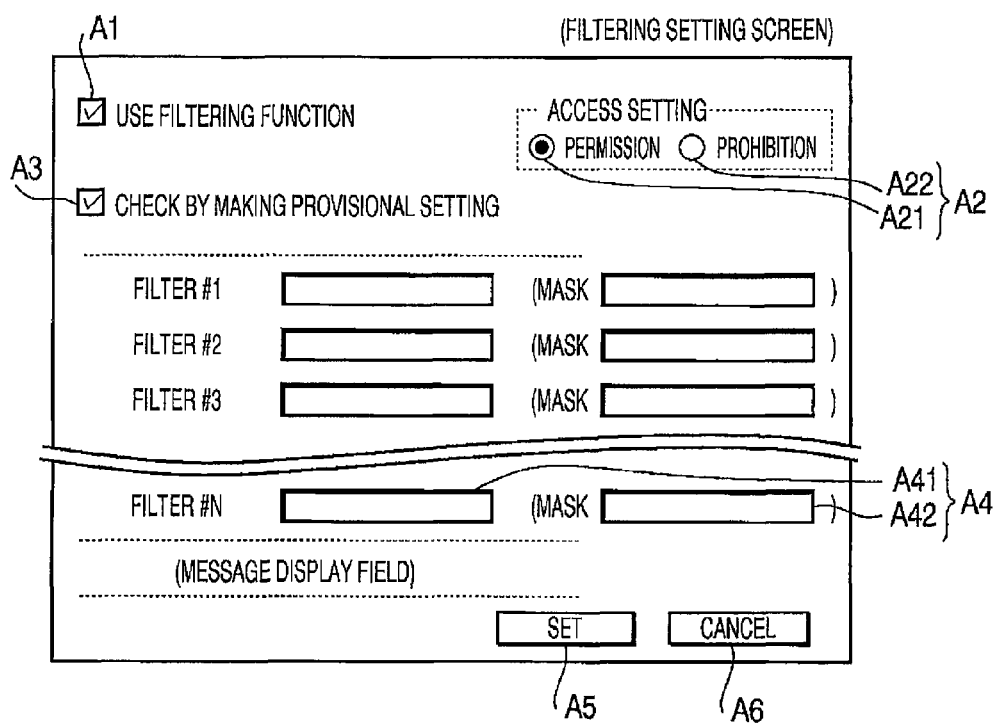
FIG. 9 is an explanatory drawing showing an example of the composition of a filtering setting screen displayed by the PC.

FIG. 9 is an explanatory drawing showing an example of the composition of the filtering setting screen. As shown in FIG. 9, the filtering setting screen comprises a check box A1 for setting the filtering function ON or OFF, a pair of radio buttons A2 (A21 and A22) for setting the filtering mode, a check box A3 for requesting the provisional setting, a plurality of input windows A4 (each of which comprises an IP address input window A41 and a mask information input window A42) for setting the address ranges, a setting key ("SET" key) A5 for inputting a setting execution instruction, and a cancel key A6 for inputting a cancellation instruction. The filtering setting screen further comprises a message display field for displaying various messages.

In the step S640, the CPU 31 sets the check box A1 in a checked state or non-checked state and marks the radio button A21 (corresponding to the "permission mode") or the radio button A22 (corresponding to the "prohibition mode") according to the current settings represented by the setting disclosure data. When an address range has been set, the CPU 31 enters IP address information and mask information (representing the address range) in the IP address input window A41 and the mask information input window A42, respectively. The CPU 31 sets the check box A3 (for requesting the provisional setting) in the checked state as the default setting.

After displaying the filtering setting screen (S640), the CPU 31 waits until operation information (representing a user operation to the input unit 43) is supplied from the input unit 43. When the operation information is received from the input unit 43 (S650: YES), the CPU 31 judges whether or not the operation information represents the pressing of the cancel key A6 (S660). If the operation information represents the pressing of the cancel key A6 (S660: YES), the function setting process of FIGS. 7 and 8 is ended.

If the operation information does not represent the pressing of the cancel key A6 (S660: NO), the CPU 31 judges whether or not the operation information represents the pressing of the setting key A5 (S670). If the operation information does not represent the pressing of the setting key A5 (S670: NO), the CPU 31 executes a process corresponding to the operation information (S680).

Specifically, the CPU 31 recognizes a target of operation on the filtering setting screen based on the operation information, and switches the check box A1 between the checked state and the non-checked state when the operation target is the check box A1. When the operation target is the radio buttons A2 (A21 and A22), the CPU 31 marks selected one of the radio buttons A21 and A22 while unmarking the other. When the operation target is the check box A3, the CPU 31 switches the check box A3 between the checked state and the non-checked state. When the operation target is one of the input windows A4, the CPU 31 enters character strings (inputted by the user through the input unit 43) in corresponding input windows A41 and A42. In the step S680, the filtering setting screen is updated based on the operation information as above.

If the operation information represents the pressing of the setting key A5 (S670: YES), the CPU 31 checks whether or not each character string inputted by the user to each of the input windows A4 (excluding empty windows with no character string) is in a proper notation representing an IP address (S690). If a character string is not in a proper notation representing an IP address (S690: NO), the CPU 31 displays a message indicating the impropriety of the IP address notation in the message display field of the filtering setting screen (S700). Thereafter, the CPU 31 returns to the step S650 to wait for new operation information supplied from the input unit 43.

On the other hand, if each character string inputted to each input window A4 is in a proper notation representing an IP address (S690: YES), the CPU 31 judges whether the check box A3 for requesting the provisional setting has been checked or not (S710). If checked (S710: YES), the process advances to step S740. If not checked (S710: NO), the process advances to step S720, in which the CPU 31 displays a confirmation screen (unshown), as an extra screen for inquiring of the user whether or not to make the setting of the printer 10 (filtering function) according to the contents of the filtering setting screen, on the display unit 41 along with the filtering setting screen.

After the confirmation screen (including a setting key and a cancel key) is displayed (S720), when operation information representing the pressing of the setting key by the user is supplied from the input unit 43 (S730: YES), the process advances to the step S740. On the other hand, when operation information representing the pressing of the cancel key by the user is supplied from the input unit 43 (S730: NO), the process returns to the step S650.

In the step S740, the CPU 31 generates the setting request data representing the values of the items A1-A4 on the filtering setting screen (that is, the setting instructions by the user), and transmits the generated setting request data to the printer 10 selected from the printer selection screen, via the communication control unit 45. Specifically, the setting request data generated and transmitted in the step S740 contains the function ON/OFF setting data (representing a value corresponding to the status of the check box A1), the mode setting data (representing a value corresponding to the status of the radio buttons A2), the provisional setting necessity data (representing a value corresponding to the status of the check box A3) and the target range setting data (representing values corresponding to the status of the input windows A4).

After transmitting the setting request data (S740), the CPU 31 judges whether the transmitted setting request data is provisional setting request data (in which the provisional setting necessity data indicates that the provisional setting is necessary) or not (S750). If the transmitted setting request data is not provisional setting request data (S750: NO), the CPU 31 waits until the aforementioned regular setting notification data is received from the printer 10 (destination of the setting request data) via the communication control unit 45 (S760). When the regular setting notification data is received (S760: YES), the CPU 31 displays a regular setting completion notification screen shown in FIG. 10A (with a message indicating the completion of the regular setting) on the display unit 41 according to the received regular setting notification data (S770).

FIG. 10A is an explanatory drawing showing an example of the composition of the regular setting completion notification screen. When an OK key on the regular setting completion notification screen is pressed by the user, the function setting process of FIGS. 7 and 8 is ended. Incidentally, while the function setting process of this example is executed basically assuming that the regular setting notification data can necessarily be received in the step S760, the function setting process may also be configured to display the filtering setting screen on the display unit 41 again and return to the step S650 when the regular setting notification data can not be received in S760 within a prescribed time period.

In the step S750, if the transmitted setting request data is provisional setting request data (S750: YES), the CPU 31 waits until the aforementioned setting change notification data is received from the printer 10 (destination of the setting request data) via the communication control unit 45 (S780). When the setting change notification data is received (S780: YES), the CPU 31 displays the regular setting confirmation screen shown in FIG. 10B (representing the current settings of the communication control unit 25, a message indicating that the provisional setting has been made, a message inquiring whether or not the regular setting may be made according to the provisional setting, the setting key for requesting the regular setting, and the cancel key for canceling the regular setting (invalidating the provisional setting)) on the display unit 41 according to the received setting change notification data (S790).

FIG. 10B is an explanatory drawing showing an example of the composition of the regular setting confirmation screen. While the function setting process of this example is executed basically assuming that the setting change notification data can necessarily be received in the step S780, the function setting process may also be configured to display the filtering setting screen on the display unit 41 again and return to the step S650 when the setting change notification data can not be received in S780 within a prescribed time period.

After displaying the regular setting confirmation screen (S790), the CPU 31 judges whether or not operation information representing the pressing of the cancel key on the regular setting confirmation screen has been received from the input unit 43 (S800). If no operation information representing the pressing of the cancel key has been received (S800: NO), the CPU 31 judges whether or not operation information representing the pressing of the setting key on the regular setting confirmation screen has been received from the input unit 43 (S810). If no operation information representing the pressing of the setting key has been received (S810: NO), the process returns to the step S800. As above, the CPU 31 waits until the cancel key or the setting key on the regular setting confirmation screen is pressed by the user (S800, S810).

When the operation information representing the pressing of the setting key is received from the input unit 43 (S810: YES), the CPU 31 transmits the regular setting instruction data to the printer 10 via the communication control unit 45 (S820).

After the transmission of the regular setting instruction data (S820), the CPU 31 judges whether or not the regular setting notification data has been received from the printer 10 via the communication control unit 45 (S830). If not received (S830: NO), the CPU 31 judges whether a timeout has occurred or not (S840). In this example, the CPU 31 judges that the timeout has occurred when the aforementioned setting restoration notification data is received from the printer 10 via the communication control unit 45. If no timeout has occurred (S840: NO), the process returns to the step S830.

The CPU 31 waits until the timeout occurs or the regular setting notification data is received from the printer 10 (destination of the regular setting instruction data) via the communication control unit 45 as above. When the regular setting notification data is received from the printer 10 (S830: YES), the CPU 31 displays the aforementioned regular setting completion notification screen on the display unit 41 according to the received regular setting notification data (S850). When the OK key on the regular setting completion notification screen is pressed by the user, the function setting process of FIGS. 7 and 8 is ended.

When the timeout occurs (S840: YES), the CPU 31 displays a setting restoration notification screen shown in FIG. 10C (with a message indicating that the settings has been restored to the original settings) on the display unit 41 according to the received setting restoration notification data (S860). FIG. 10C is an explanatory drawing showing an example of the composition of the setting restoration notification screen. When an OK key on the setting restoration notification screen is pressed by the user, the CPU 31 displays the aforementioned filtering setting screen (indicating the current settings of the communication control unit 25 represented by the setting restoration notification data) on the display unit 41 (S870). Thereafter, the process returns to the step S650.

In the step S800, if the operation information representing the pressing of the cancel key on the regular setting confirmation screen has been received from the input unit 43 (S800: YES), the CPU 31 transmits the cancellation instruction data to the printer 10 (destination of the setting request data) via the communication control unit 45 (S880).

After the transmission of the cancellation instruction data (S880), the CPU 31 waits until the setting restoration notification data is received from the printer 10 (destination of the cancellation instruction data) via the communication control unit 45 (S890). When the setting restoration notification data is received (S890: YES), the CPU 31 displays the setting restoration notification screen of FIG. 10C on the display unit 41 according to the received setting restoration notification data (S900). When the OK key on the setting restoration notification screen is pressed by the user, the CPU 31 displays the filtering setting screen (indicating the current settings of the communication control unit 25 represented by the setting restoration notification data) on the display unit 41 (S910). Thereafter, the process returns to the step S650.

As described above, in the communication system 1 in accordance with the first example, the communication control unit 25 of the printer 10 determines whether or not to accept data received from a device on the LAN based on prescribed information on the address ranges. When the communication control unit 25 determines to accept the received data (S160: YES or S220: NO), the communication control unit 25 supplies (transfers) the received data to a corresponding task on the downstream side (S170). When the communication control unit 25 determines not to accept the received data (S160: NO or S220: YES), the communication control unit 25 discards the received data (S230), by which the filtering function is realized.

At the startup, the communication control unit 25 sets the operation parameters regarding its own filtering function (the address ranges, etc.) according to the contents of the filtering setting data stored in the NVRAM 17 (S110). Thereafter, the communication control unit 25 carries out the filtering function according to the settings (operation parameters) until the operation parameters are changed by another task.

When the setting request data (representing the setting change instructions by the user regarding the settings of the filtering function of the communication control unit 25) is received from a device on the LAN via the communication control unit 25, the printer 10 (CPU 11) makes a setting change regarding the filtering function according to the instructions represented by the setting request data (the request acceptance process). For example, when the received setting request data is provisional setting request data, the printer 10 makes the provisional setting by changing the operation parameters regarding the filtering function of the communication control unit 25 according to the instructions represented by the setting request data (S440).

After making the setting change (provisional setting) (S440), the printer 10 transmits the setting change notification data (indicating that the setting change has been made) to the device (sender of the setting request data) via the communication control unit 25 (S460). In response to the setting change notification data, data (regular setting instruction data, etc.) is transmitted from the device (sender of the setting request data) to the printer 10. The printer 10 judges whether communication with the device (sender of the setting request data as the cause of the setting change) can be performed normally via the communication control unit 25 or not based on whether such data (regular setting instruction data, etc.) can be received or not (S470-S490).

When the regular setting instruction data is received successfully within a prescribed time period, the printer 10 judges that the communication can be performed normally via the communication control unit 25 (S470: YES) and makes the regular setting by updating the filtering setting data stored in the NVRAM 17 to values corresponding to the current settings of the communication control unit 25 (S500). After making the regular setting, the printer 10 transmits the regular setting notification data (indicating that the regular setting has been completed) to the device (sender of the setting request data) via the communication control unit 25 (S510).

On the other hand, when the regular setting instruction data (or the cancellation instruction data) can not be received within the prescribed time period, the printer 10 judges that the communication can not be performed normally via the communication control unit 25 (S480: YES) and restores the operation parameters of the communication control unit 25 to those before the setting change (provisional setting) of S440 (S520).

After restoring the settings (S520), the printer 10 transmits the setting restoration notification data (indicating that the settings have been restored to the original settings) to the device (sender of the setting request data) via the communication control unit 25 (S530).

As above, in the communication system 1 of the first example, when the user making the settings of the filtering function of a printer 10 (especially, the settings of the address ranges) via a PC 30 erroneously makes a setting change that disables access to the printer 10 (setting target device) from the PC 30 (management device or setting source device from which the setting is made), the setting change is invalidated.

By the communication system 1, continuing inaccessibility to the printer 10 (setting target device) from the PC 30 (management device) can be avoided even when an erroneous setting regarding the filtering function of the printer 10 is made by the user via the PC 30. Thus, in spite of the erroneous setting that can disable access to the printer 10 (setting target device) from the PC 30 (management device), the user is prevented from being disabled from making access to the printer 10 (setting target device) via the PC 30 (management device) again and making proper settings of the filtering function of the printer 10. Since careless mistakes tend to occur especially in the address range settings, a printer 10 and a communication system 1 having high usability to the user can be realized by providing the printer 10 with the function of invalidating inappropriate settings as in this example.

Further, the printer 10 in this example transmits notification data (representing the result of a setting change) to the sender of the setting request data irrespective of whether the setting change is provisional setting or regular setting, by which a message indicating that the setting change has been made can be displayed to the user. Thus, the user is prevented from mistaking the settings of the communication control unit 25 even when a setting change is made independently of the user's intention (e.g. the setting change of S520 which is made when the judgment of S480 is YES).

Incidentally, while the problem of being disabled from making access to the printer 10 (setting target device) from the PC 30 (management device, setting source device) via the communication control unit 25 due to inappropriate setting change instructions by the user is resolved in the first example by making the regular setting (based on the judgment that the communication can be performed normally) only when the regular setting instruction data is successfully received from the sender of the setting request data while invalidating the provisional setting when the regular setting instruction data can not be received, the problem can also be resolved by, for example, letting the PC 30 judge whether the contents of the setting request data are appropriate or not before the transmission of the setting request data to the printer 10 (setting target device), as described below.

Second Example

In the following, a communication system 1 in accordance with a second example will be described referring to FIGS. 11 and 12.

The communication system 1 of the second example described below has a configuration basically identical with that of the communication system 1 of the first example, except that the function setting program and the function setting process executed by the CPU 31 of the PC 30 according to the function setting program are slightly different from those of the first example. Therefore, the following explanation of the second example will be given focusing on the function setting process executed by the CPU 31 of the PC 30 in the second example. FIG. 11 is a flow chart showing the function setting process which is executed by the CPU 31 according to the function setting program in the communication system 1 of the second example.

Figure 11:
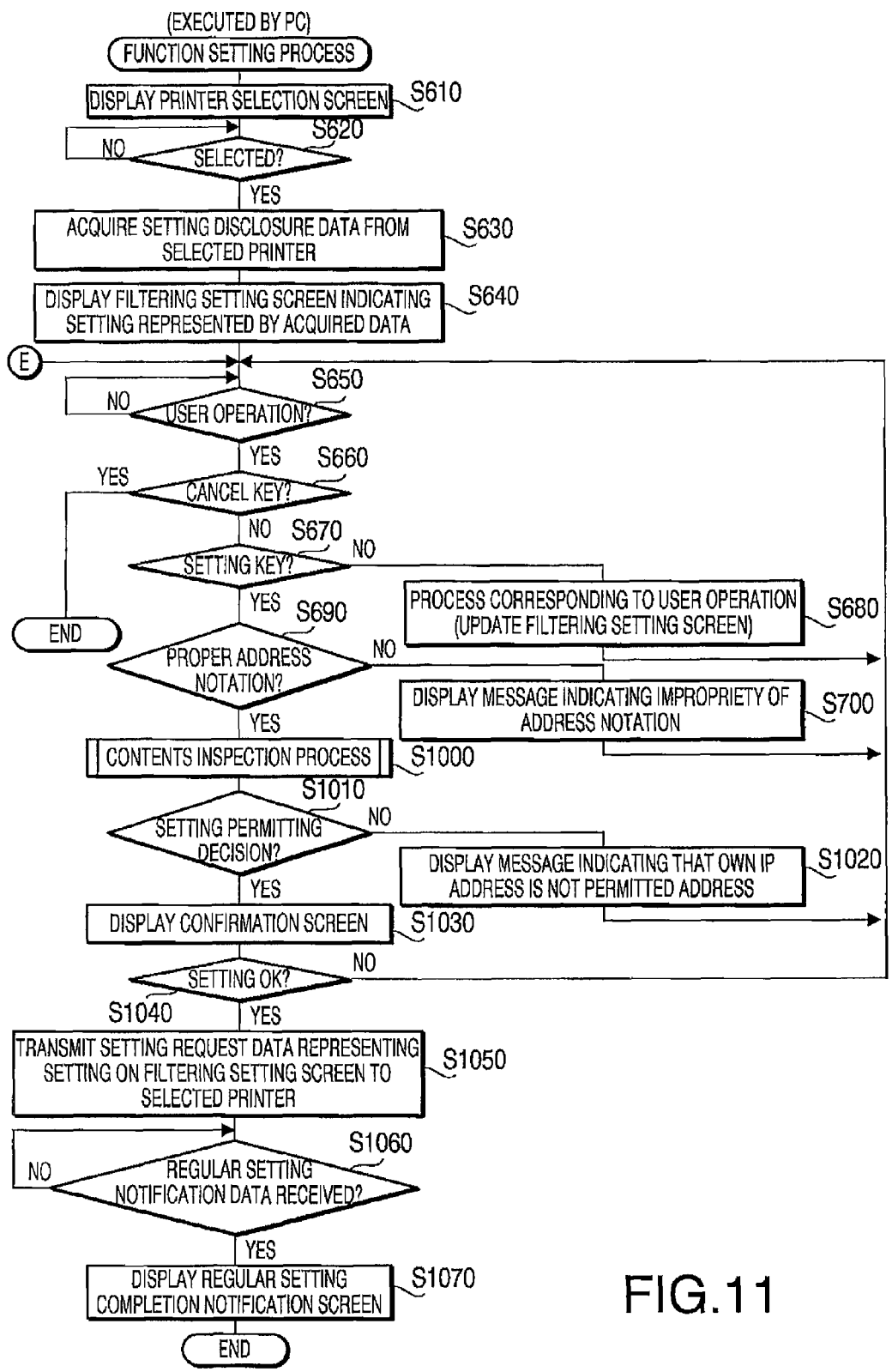
FIG. 11 is a flow chart showing a function setting process which is executed by a CPU of a PC included in a communication system in accordance with a second example.
Figure 12:
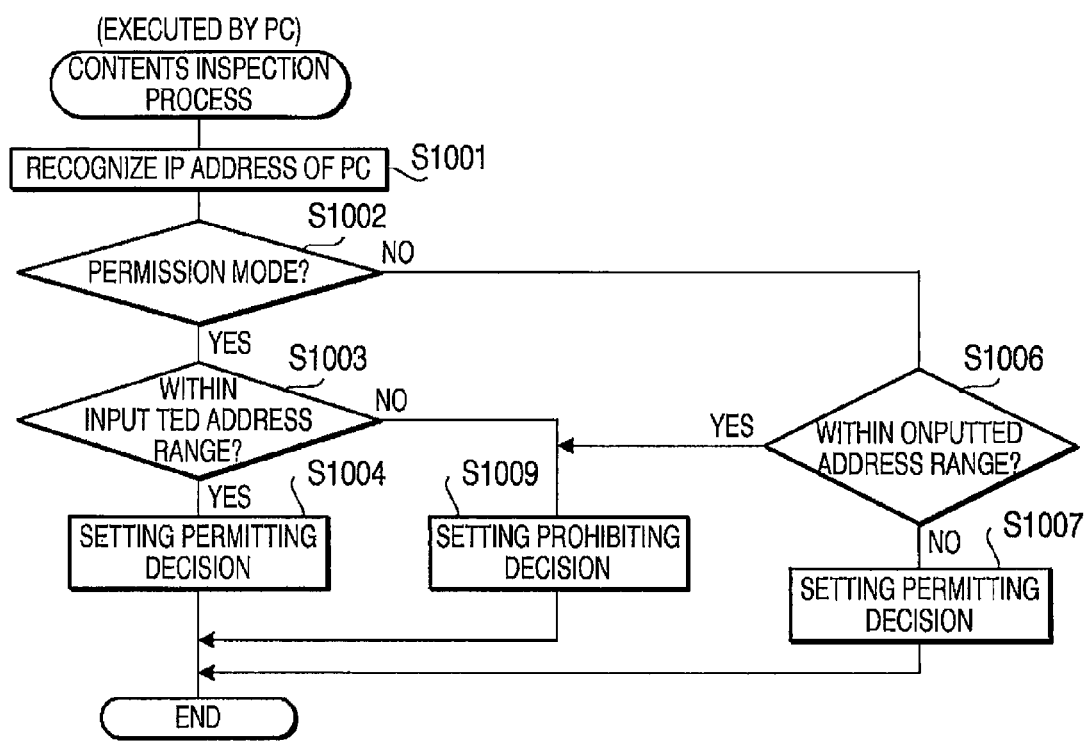
FIG. 12 is a flow chart showing a contents inspection process which is executed by the CPU of the PC.

In the second example, the CPU 31 of the PC 30 executes the function setting process shown in FIG. 11 in response to the function setting program execution instruction inputted by the user through the input unit 43.

At the start of the function setting process, the CPU 31 executes the steps S610-S690 similarly to the first example. However, the filtering setting screen (indicating the current settings of the filtering function of the printer 10) displayed on the display unit 41 in the step S640 in the second example does not comprise the check box A3 for requesting the provisional setting, differently from the filtering setting screen of the first example.

When the judgment in S690 is NO, the CPU 31 advances to the step S700 similarly to the first example. When the judgment in S690 is YES, the CPU 31 advances to step S1000 to execute a contents inspection process shown in FIG. 12. FIG. 12 is a flow chart showing the contents inspection process executed by the CPU 31.

At the start of the contents inspection process, the CPU 31 recognizes the IP address of the PC 30 (including the CPU 31 itself) which has been registered in the communication control unit 45 (S1001) and judges whether the "permission mode" has been selected on the filtering setting screen or not by referring to the radio buttons A2 on the screen (S1002). If the "permission mode" has been selected (S1002: YES), the CPU 31 judges whether or not the IP address of the PC 30 is within one of the address ranges represented by the values in the input windows A4 (S1003).

If the IP address of the PC 30 is within one of the address ranges (S1003: YES), the CPU 31 judges that the values in the input windows A4 does not disable the access to the printer 10 from the PC 30. In this case, the CPU 31 makes a "setting permitting decision" (permitting the transmission of the setting request data), outputs the decision as a return value (S1004), and ends the contents inspection process of FIG. 12.

On the other hand, if the IP address of the PC 30 is within none of the address ranges (S1003: NO), the CPU 31 judges that the values in the input windows A4 disable the access to the printer 10 from the PC 30. In this case, the CPU 31 makes a "setting prohibiting decision" (prohibiting the transmission of the setting request data), outputs the decision as the return value (S1009), and ends the contents inspection process of FIG. 12.

In the step S1002, if the "permission mode" has not been selected on the filtering setting screen, that is, if the "prohibition mode" has been selected (S1002: NO), the CPU 31 judges whether or not the IP address of the PC 30 is within one of the address ranges represented by the values in the input windows A4 (S1006).

If the IP address of the PC 30 is within one of the address ranges (S1006: YES), the CPU 31 judges that the values in the input windows A4 disable the access to the printer 10 from the PC 30, makes the setting prohibiting decision (prohibiting the transmission of the setting request data), outputs the decision as the return value (S1009), and ends the contents inspection process of FIG. 12.

On the other hand, if the IP address of the PC 30 is within none of the address ranges (S1006: NO), the CPU 31 judges that the values in the input windows A4 does not disable the access to the printer 10 from the PC 30, makes the setting permitting decision (permitting the transmission of the setting request data), outputs the decision as the return value (S1007), and ends the contents inspection process of FIG. 12.

After finishing the contents inspection process (S1000), the CPU 31 judges whether the decision made in the contents inspection process is the setting permitting decision or not (S1010). If the decision is not the setting permitting decision, that is, if the decision is the setting prohibiting decision (S1010: NO), the CPU 31 displays a message, indicating that the IP address of the PC 30 is not a "permitted address" that can be accepted by the printer 10, in the message display field of the filtering setting screen together with the IP address of the PC 30 (S1020). Thereafter, the process returns to the step S650.

On the other hand, if the decision made in the contents inspection process is the setting permitting decision (S1010: YES), the CPU 31 displays the confirmation screen (unshown), as an extra screen for inquiring of the user whether to make the setting of the printer 10 (filtering function) according to the contents of the filtering setting screen, on the display unit 41 along with the filtering setting screen (1030).

After the confirmation screen (including the setting key and the cancel key) is displayed (S1030), when the operation information representing the pressing of the setting key by the user is supplied from the input unit 43, the CPU 31 judges that an execution instruction has been inputted (S1040: YES) and advances to step S1050. On the other hand, when the operation information representing the pressing of the cancel key by the user is supplied from the input unit 43, the CPU 31 judges that a cancellation instruction has been inputted (S1040: NO) and returns to the step S650.

In the step S1050, the CPU 31 generates setting request data representing the values of the items A1, A2 and A4 on the filtering setting screen (that is, the setting instructions by the user), and transmits the generated setting request data to the printer 10 selected from the printer selection screen, via the communication control unit 45. Specifically, the setting request data generated and transmitted in the step S1050 contains the function ON/OFF setting data (representing a value corresponding to the status of the check box A1), the mode setting data (representing a value corresponding to the status of the radio buttons A2) and the target range setting data (representing values corresponding to the status of the input windows A4). Incidentally, since the "provisional setting necessity data" in the first example is not contained in the setting request data in the second example, the printer 10 in the second example is configured to constantly judge "NO" in the step S410 of the request acceptance process of FIG. 6.

After transmitting the setting request data (S1050), the CPU 31 waits until the regular setting notification data is received from the printer 10 (destination of the setting request data) via the communication control unit 45 (S1060). When the regular setting notification data is received (S1060: YES), the CPU 31 displays the regular setting completion notification screen of FIG. 10A on the display unit 41 (S1070). When the OK key on the regular setting completion notification screen is pressed by the user, the function setting process of FIG. 11 is ended.

As described above, in the communication system 1 in accordance with the second example, the PC 30 (CPU 31) executes the function setting process of FIG. 11 when the function setting program execution instruction is inputted by the user through the input unit 43. In the function setting process, the PC 30 displays the filtering setting screen (for receiving the setting change instructions by the user regarding the filtering function of a printer 10) on the display unit 41 (S640) when the printer 10 is selected by the user from the printer selection screen (S620: YES).

The PC 30 (CPU 31) changes the values of the items A1, A2 and A4 on the filtering setting screen according to the user's setting change instructions which are supplied from the input unit 43 as the operation information. When the setting key on the filtering setting screen is pressed by the user, the PC 30 generates the setting request data representing the values of the items A1, A2 and A4 on the filtering setting screen, and transmits the setting request data to the selected printer 10 (S1050) on the condition that the contents of the setting request data are appropriate.

Before the transmission of the setting request data (S1050), the PC 30 executes the contents inspection process to check whether the contents of the setting request data is appropriate or not (S1000), in which the PC 30 compares its own IP address with the address ranges represented by the values in the input windows A4 and thereby judges whether or not making settings of the printer 10 (filtering function) according to the instructions represented by the setting request data according to the filtering setting screen (i.e. a setting change) disables the printer 10 from receiving (accepting) data from the PC 30 via the communication control unit 25. If the setting change disables the printer 10 from receiving data from the PC 30, the PC 30 makes the "setting prohibiting decision" (S1009).

In the case where the "setting prohibiting decision" is made (S1010: NO), the PC 30 displays a warning message on the display unit 41 (S1020) and returns to the step S650 without transmitting the setting request data to the printer 10.

As above, in the communication system 1 of the second example, whether the setting change instructions inputted by the user are appropriate or not is judged on the PC side, and the transmission of the setting request data to the printer 10 (setting change) is canceled when the setting change instructions are inappropriate.

Therefore, by the second example, even when the user inputs erroneous (inappropriate) values to the input windows A4, inappropriate settings of the filtering function of the printer 10 leading to the disablement of access to the printer 10 (setting target device) from the PC 30 (management device, setting source device) can be avoided, by which the user is prevented from becoming incapable of making settings of the printer 10 from the PC 30 via the network (LAN).

Incidentally, while the communication systems 1 of the first and second examples have been described above assuming that the function setting program has been installed in some of the PCs 30, the communication systems 1 may also be configured so that data substituting for the function setting program can be transmitted from a printer 10 to a PC 30 via a Web server, as described below.

Third Example

In the following, a communication system 101 in accordance with a third example will be described referring to FIGS. 13-17.

Figure 13:
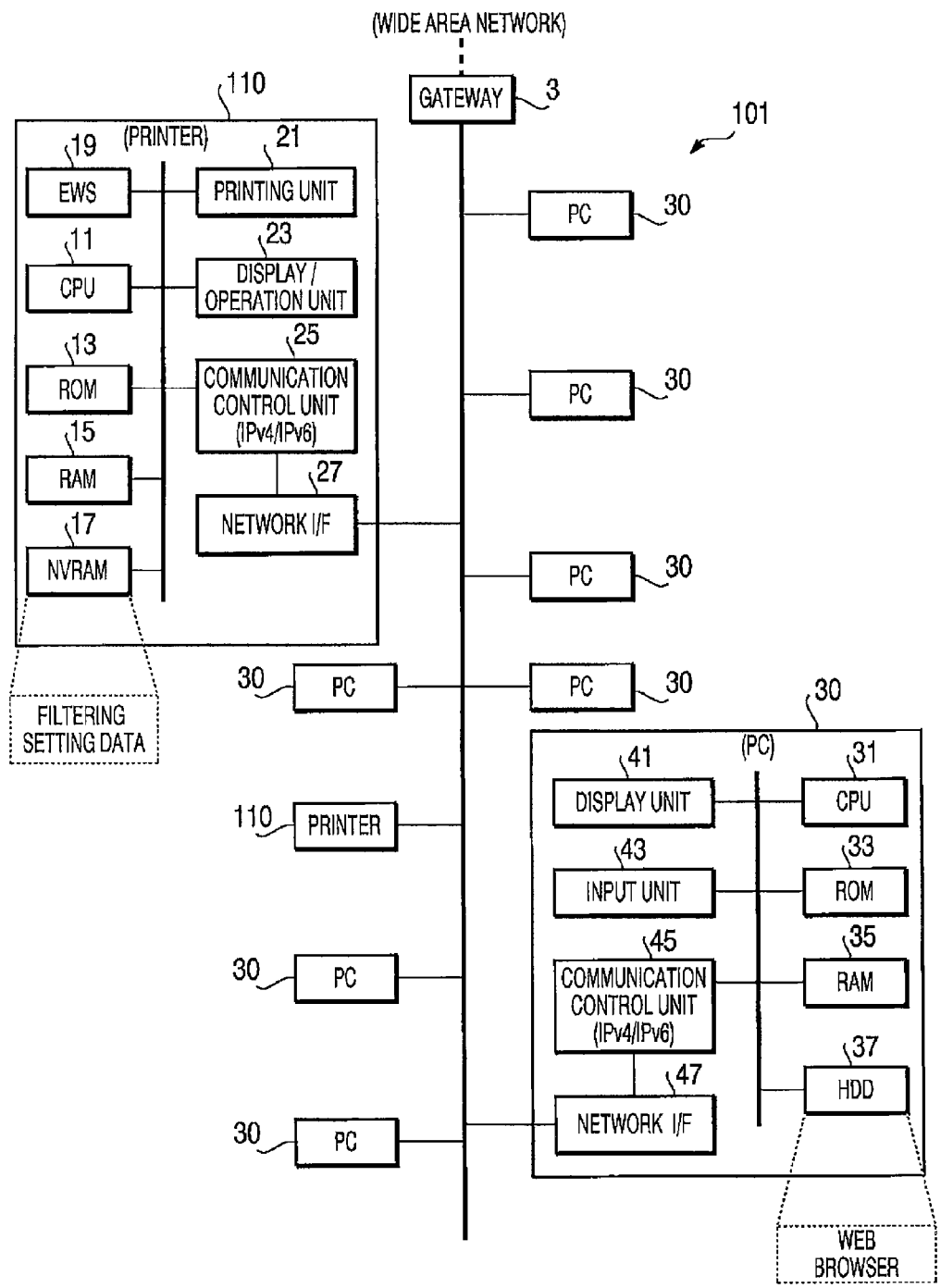
FIG. 13 is a block diagram showing the composition of a communication system in accordance with a third example.

FIG. 13 is a block diagram showing the composition of the communication system 101 according to the third example. In the communication system 101 of the third example, each printer 110 (in place of each printer 10 in the first example) is equipped with an embedded Web server (EWS) 19. Meanwhile, a Web browser (program) for letting the CPU 31 execute a process for interpreting a Web page supplied from the embedded Web server 19 and displaying a screen corresponding to the Web page on the display unit 41 is installed in the HDD 37 of each PC 30.

The communication system 101 of the third example described below is configured similarly to the communication system 1 of the first example, except that each printer 110 is designed to let the embedded Web server 19 execute a setting change process shown in FIGS. 14 and 15 (instead of letting the CPU 11 execute the setting change process of FIG. 5) and each PC 30 is designed to display various setting screens not through the function setting program but through the Web browser. Therefore, the following explanation of the third example will be given focusing on the operation of the embedded Web server 19 of the printer 110 and the operation of the PC 30 implemented by the Web browser, while omitting explanations of components of the printer 110 and PC 30 identical with those in the first example.

Incidentally, while the embedded Web server (EWS) 19 and the CPU 11 are shown separately in FIG. 13, the embedded Web server 19 may either be implemented by a special-purpose device (e.g. special-purpose microcomputer) or by letting the CPU 11 execute a corresponding program. The communication control unit 25 in the third example handles the embedded Web server 19 as a virtual task which is similar to each "task" (explained above) executed by the CPU 11. Therefore, when data for the embedded Web server 19 is received by the network I/F 27, the communication control unit 25 supplies (transfers) the data to the embedded Web server 19 (virtual task) in the reception control process (see FIG. 4). In this example, processes executed by the embedded Web server 19 are assumed to be implemented by programs.

Figure 14:
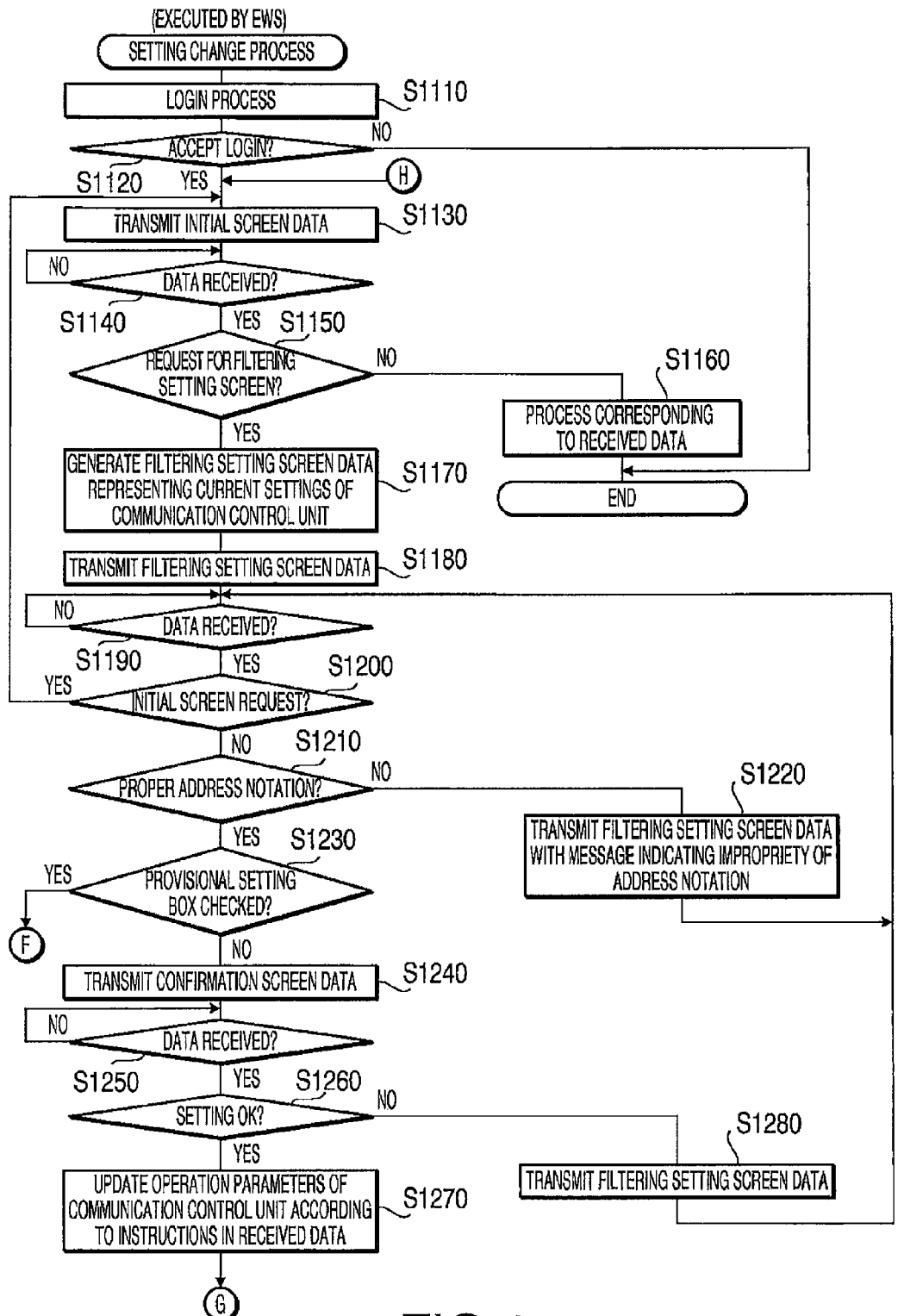
FIGS. 14 and 15 are flow charts showing a setting change process which is executed by an embedded Web server of a printer included in the communication system of FIG. 13.
Figure 15:
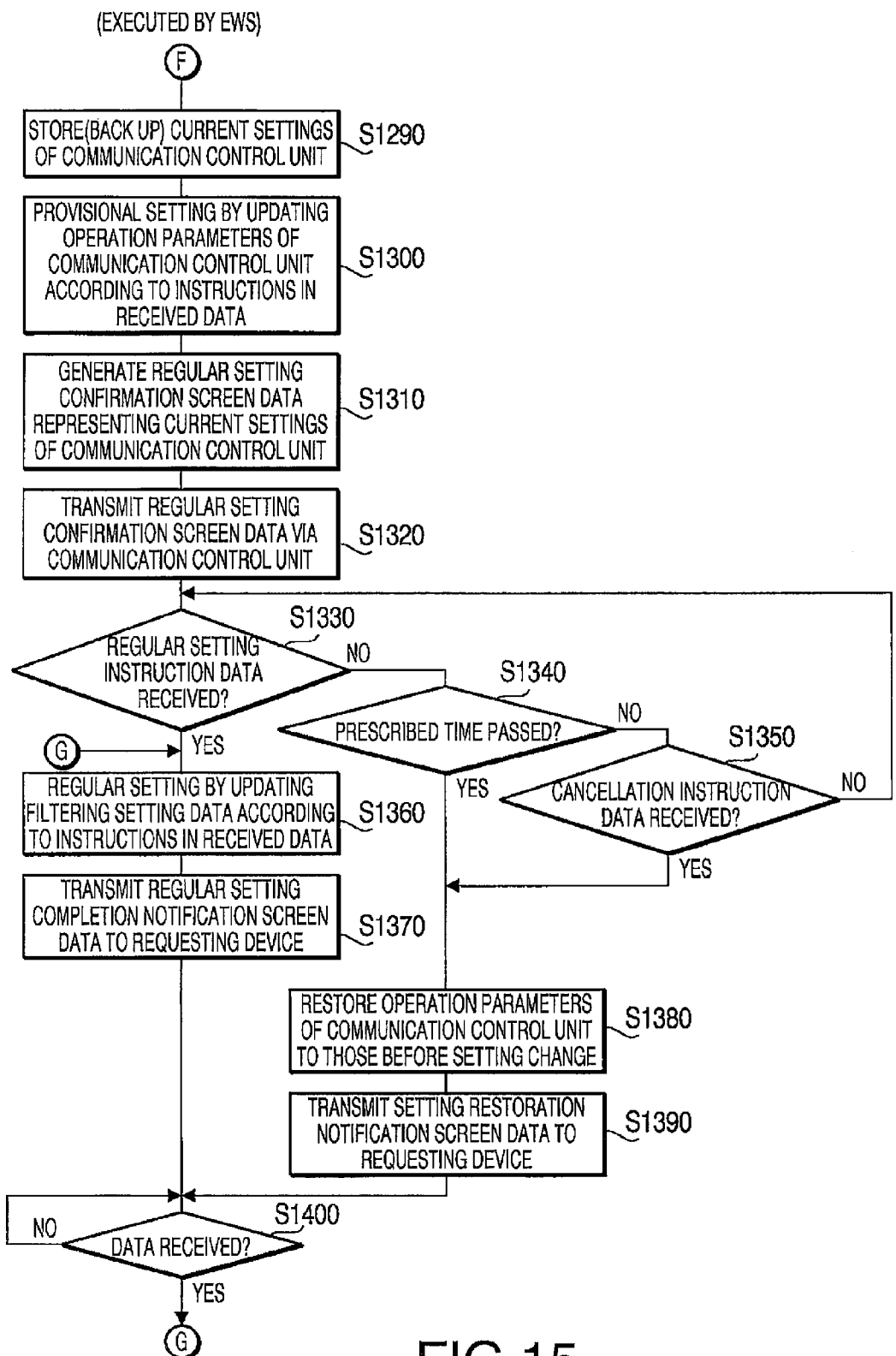

FIGS. 14 and 15 are flow charts showing the setting change process executed by the embedded Web server 19 of the printer 110. The embedded Web server 19 executes the setting change process of FIGS. 14 and 15 when "connection request data" for a setting change program (working under the embedded Web server 19) is received from a device (PC 30) on the LAN via the communication control unit 25.

At the start of the setting change process, the embedded Web server 19 executes a login process and thereby acquires authentication information (e.g. login ID) from the device (PC 30) that sent the connection request data (S1110). Subsequently, the embedded Web server 19 judges whether the user of the device is an authorized user or not based on the authentication information (S1120). If the user is an authorized user, the embedded Web server 19 accepts the login (S1120: YES) and advances to step S1130. If the user is an unauthorized user, the embedded Web server 19 rejects the login (S1120: NO) and ends the setting change process of FIGS. 14 and 15.

In the step S1130, the embedded Web server 19 transmits "initial screen data" (Web page: data in the HTML (Hyper-Text Markup Language) format, for example), for letting the device (PC 30 as the sender of the connection request data) display a selection screen (allowing the user to select various services (including a logout service) provided by the device) as an initial screen, to the device via the communication control unit 25. Subsequently, the embedded Web server 19 waits until request data regarding a service selected by the user from the initial screen is received from the device (S1140). When the request data is received (S1140: YES), the embedded Web server 19 judges whether or not the request data is a request for the filtering setting screen (S1150). If the request data is not a request for the filtering setting screen (S1150: NO), the embedded Web server 19 executes a process corresponding to the request data (S1160) and ends the setting change process of FIGS. 14 and 15.

On the other hand, if the request data is a request for the filtering setting screen (S1150: YES), the embedded Web server 19 generates "filtering setting screen data" (Web page) representing the current settings of the communication control unit 25 (S1170) and transmits the filtering setting screen data to the device via the communication control unit 25 (S1180).

The filtering setting screen data is data for letting the Web browser of the device (PC 30 as the sender of the connection request data) display the filtering setting screen in the format shown in FIG. 9. The filtering setting screen data in the HTML format can be generated by, for example, describing the following tags in the form tag:

(1) an input tag of the "checkbox" type (as a tag for displaying the check box A1)

(2) input tags of the "radio" type (as tags for displaying the radio buttons A2) for the radio buttons A21 and A22

(3) an input tag of the "checkbox type" (as a tag for displaying the check box A3)

(4) input tags of the "text" type (as tags for displaying the input windows A4) for all the input windows A4

(5) an input tag of the "submit" type (as a tag for displaying the setting key A5)

(6) a button tag (for transmitting request data requesting the initial screen) including link information to the initial screen (as a tag for displaying the cancel key A6)

As a method for incorporating the current settings of the filtering function of the communication control unit 25 in the filtering setting screen data, the current settings can be described in the filtering setting screen data by attaching set values (for controlling the contents or elements of the initial screen) to corresponding input tags. For example, it is possible to attach a value "CHECKED" (requesting the checking of a check box) to an input tag of the "checkbox" type and attach an IP address currently set (as the parameter VALUE) to an input tag of the "text" type, as needed.

After generating the filtering setting screen data incorporating the current settings and transmitting the filtering setting screen data to the device (PC 30 as the sender of the connection request data) as above (S1170, S1180), the embedded Web server 19 waits until data (request data requesting the initial screen or input result data representing inputs by the user), transmitted from the device in response to the user's pressing of the setting key or the cancel key on the filtering setting screen displayed by the Web browser according to the filtering setting screen data, is received via the communication control unit 25 (S1190). When data is received (S1190: YES), the embedded Web server 19 judges whether or not the received data is the request data requesting the initial screen (S1200).

If the received data is the request data requesting the initial screen (S1200: YES), the embedded Web server 19 returns to the step S1130 (transmits the initial screen data to the device again according to the request) and thereafter executes the steps from S1140.

If the received data is the input result data representing inputs by the user to the items A1-A4 on the filtering setting screen (S1200: NO), the embedded Web server 19 judges whether each character string inputted by the user to each of the input windows A4 on the filtering setting screen (excluding empty windows with no character string) is in a proper notation representing an IP address or not based on the values in the input windows A4 represented by the received input result data (S1210). If a character string is not in a proper notation representing an IP address (S1210: NO), the process advances to step S1220.

In the step S1220, the embedded Web server 19 generates filtering setting screen data incorporating the inputs made by the user so far to the filtering setting screen and containing a character string to be used by the Web browser for displaying a message indicating the impropriety of the IP address notation, and transmits the generated filtering setting screen data to the device via the communication control unit 25. Thereafter, the process returns to the step S1190.

On the other hand, if each character string inputted to each input window A4 is in a proper notation representing an IP address (S1210: YES), the embedded Web server 19 judges whether the value of the check box A3 contained in the input result data represents the checked state or not (S1230). If the value represents the non-checked state (S1230: NO), the embedded Web server 19 transmits "confirmation screen data" (Web page), for letting the Web browser display a confirmation screen with a confirmation message inquiring of the user whether to make the setting of the filtering function according to the contents of the filtering setting screen, to the device (S1240).

Incidentally, the confirmation screen data comprises information for letting the Web browser display a setting key pressed for transmitting a value representing "SETTING OK" and a cancel pressed key for transmitting a value representing "SETTING NG" (e.g. a button tag for transmitting the value representing "SETTING OK" when a corresponding key (setting key) is pressed and a button tag for transmitting the value representing "SETTING NG" when a corresponding key (cancel key) is pressed). When the setting key on the confirmation screen is pressed by the user, data containing the value representing "SETTING OK" is transmitted from the device to the printer 10. When the cancel key on the confirmation screen is pressed by the user, data containing the value representing "SETTING NG" is transmitted from the device to the printer 10.

Therefore, the embedded Web server 19 after transmitting the confirmation screen data (S1240) waits until the data containing the value representing "SETTING OK" or the data containing the value representing "SETTING NG" is received from the device via the communication control unit 25 (S1250). When data is received (S1250: YES), the embedded Web server 19 judges whether or not the received data is the data containing the value representing "SETTING OK" (S1260).

If the received data is not the data containing the value representing "SETTING OK" (S1260: NO), the embedded Web server 19 generates filtering setting screen data incorporating the inputs made by the user so far to the filtering setting screen, and transmits the filtering setting screen data to the device via the communication control unit 25 (S1280). Thereafter, the process returns to the step S1190.

On the other hand, if the received data is the data containing the value representing "SETTING OK" (S1260: YES), the embedded Web server 19 updates the operation parameters of the communication control unit 25 according to the inputs represented by the input result data received previously (S1270) and thereafter advances to step S1360. In the step S1360, the embedded Web server 19 changes the settings of the filtering function (makes the regular setting) by updating the filtering setting data stored in the NVRAM 17 according to the inputs represented by the input result data (or according to the current settings of the communication control unit 25).

After making the regular setting (S1360), the embedded Web server 19 transmits "regular setting completion notification screen data" (Web page) representing each value of the updated filtering setting data stored in the NVRAM 17 (data for letting the Web browser display the aforementioned regular setting completion notification screen shown in FIG. 10A) to the device (S1370). Subsequently, the embedded Web server 19 waits until request data requesting the initial screen (transmitted from the device when an OK key on the regular setting completion notification screen is pressed by the user) is received (S1400). When the request data requesting the initial screen is received (S1400: YES), the embedded Web server 19 returns to the step S1130 and transmits the initial screen data to the device again.

In the step S1230, if the value of the check box A3 contained in the input result data represents the checked state (S1230: YES), the process advances to step S1290. In the step S1290, the embedded Web server 19 temporarily stores the current values of the operation parameters of the communication control unit 25 in the RAM 15, that is, makes a backup of the operation parameters of the communication control unit 25.

After making the backup (S1290), the embedded Web server 19 makes the provisional setting of the filtering function by updating the operation parameters of the communication control unit 25 according to the inputs represented by the input result data received from the device (S1300). After making the provisional setting (S1300), the embedded Web server 19 generates "regular setting confirmation screen data" (Web page) representing the current settings of the communication control unit 25 (the settings regarding the ON/OFF of the filtering function, the filtering mode, and the address ranges) as data for letting the Web browser display the aforementioned regular setting confirmation screen shown in FIG. 10B (S1310) and transmits the regular setting confirmation screen data to the device (S1320).

After the transmission of the regular setting confirmation screen data (S1320), the embedded Web server 19 judges whether or not the regular setting instruction data has been received from the device via the communication control unit 25 (S1330). If no regular setting instruction data has been received (S1330: NO), the embedded Web server 19 judges whether or not a prescribed time period has passed since the transmission of the regular setting confirmation screen data (S1340). If the prescribed time period has not passed yet (S1340: NO), the embedded Web server 19 judges whether or not the cancellation instruction data has been received from the device via the communication control unit 25 (S1350). If no cancellation instruction data has been received (S1350: NO), the embedded Web server 19 returns to the step S1330. By the above timeout process, the embedded Web server 19 waits until the regular setting instruction data or the cancellation instruction data is received from the device via the communication control unit 25 or the prescribed time period passes.

If the regular setting instruction data has been received from the device via the communication control unit 25 (S1330: YES), the embedded Web server 19 makes the regular setting by updating the filtering setting data stored in the NVRAM 17 according to the inputs represented by the input result data received prior to the regular setting instruction data (or according to the current settings of the communication control unit 25) (S1360). After making the regular setting (S1360), the embedded Web server 19 transmits the regular setting completion notification screen data (Web page), representing each value of the updated filtering setting data stored in the NVRAM 17, to the device (S1370) and thereafter advances to the step S1400.

On the other hand, if the prescribed time period has passed since the transmission of the regular setting confirmation screen data without receiving the regular setting instruction data nor the cancellation instruction data (S1340: YES) or if the cancellation instruction data is received from the device via the communication control unit 25 within the prescribed time period (S1350: YES), the embedded Web server 19 restores the values of the operation parameters of the communication control unit 25 to those before the update of S1300 based on the values backed up in S1290 (S1380), by which the provisional setting which has been made in S1300 is invalidated. Subsequently, the embedded Web server 19 transmits "setting restoration notification screen data" (Web page) representing the current settings of the communication control unit 25 (data for letting the Web browser display the aforementioned setting restoration notification screen shown in FIG. 10C) to the device (S1390) and thereafter advances to the step S1400.

Figure 16:
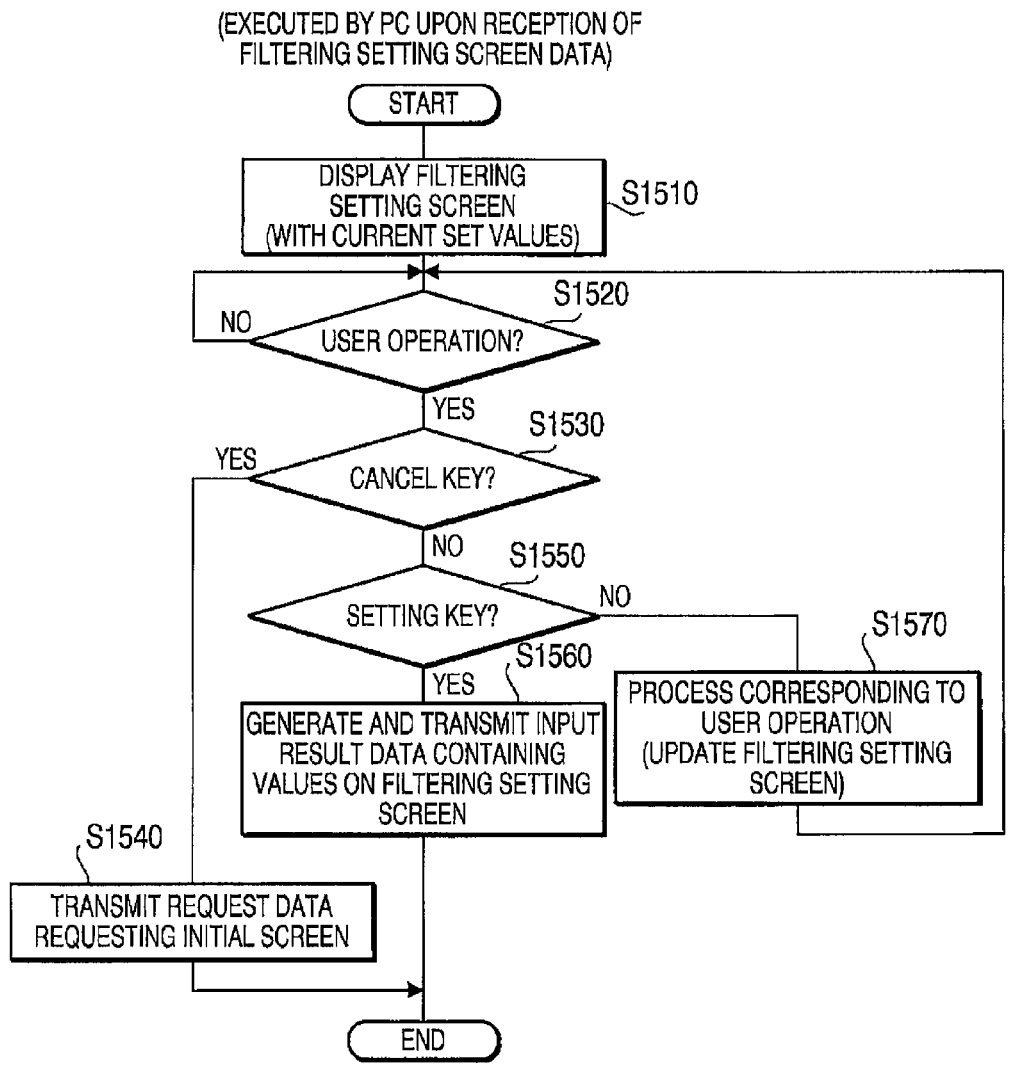
FIG. 16 is a flow chart showing a process which is executed by a CPU of a PC included in the communication system upon reception of filtering setting screen data.
Figure 17:
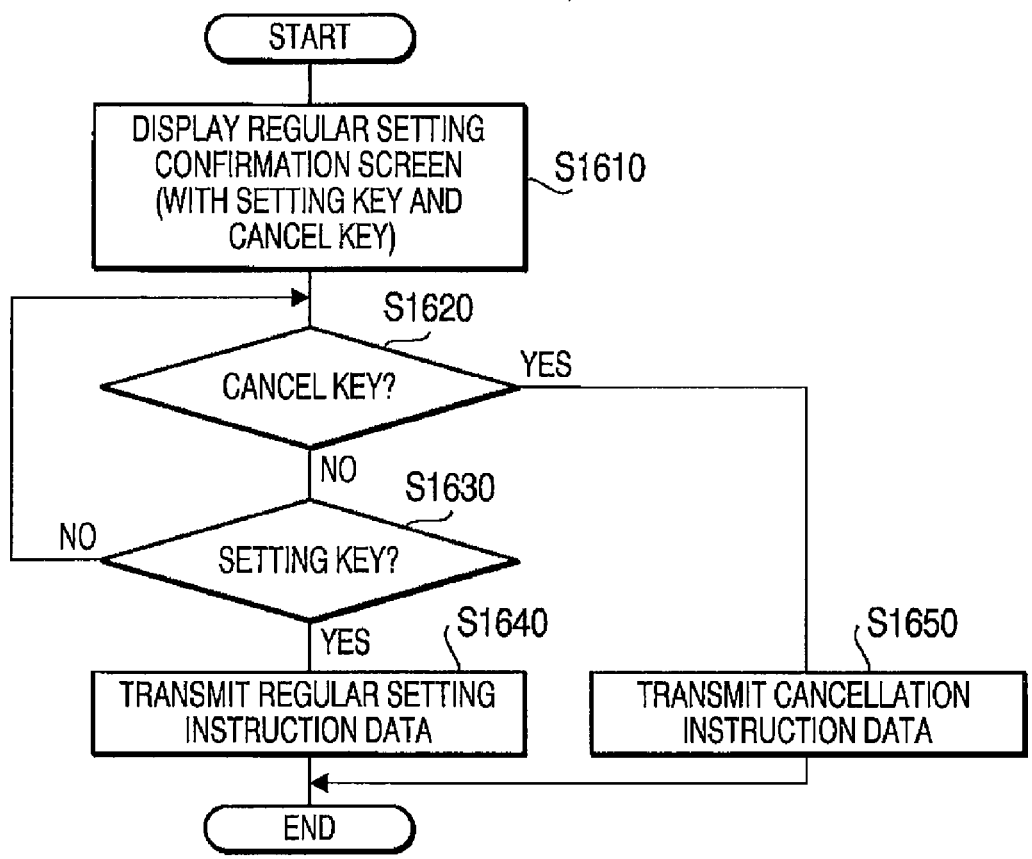
FIG. 17 is a flow chart showing a process which is executed by the CPU of the PC upon reception of regular setting confirmation screen data.

Next, processes which are executed by the CPU 31 of the device (PC 30 as the sender of the connection request data) by use of the Web browser upon reception of the aforementioned filtering setting screen data and regular setting confirmation screen data via the communication control unit 45 will be explained referring to FIGS. 16 and 17. FIG. 16 is a flow chart showing a process executed by the CPU 31 upon reception of the filtering setting screen data. FIG. 17 is a flow chart showing a process executed by the CPU 31 upon reception of the regular setting confirmation screen data.

Referring to FIG. 16, when the filtering setting screen data is received, the CPU 31 of the device (PC 30) displays the filtering setting screen in a screen (Web page) display area of the Web browser (on the display unit 41) according to the received filtering setting screen data (S1510) and thereafter waits until operation information regarding the filtering setting screen is received from the input unit 43 (S1520).

When operation information is received (S1520: YES), the CPU 31 judges whether or not the operation information represents the pressing of the cancel key on the filtering setting screen (S1530). If the operation information represents the pressing of the cancel key (S1530: YES), the CPU 31 transmits the request data requesting the initial screen to the embedded Web server 19 of the printer 10 (destination of the connection request data) via the communication control unit 45 (S1540) and ends the process of FIG. 16.

If the operation information does not represent the pressing of the cancel key (S1530: NO), the CPU 31 judges whether or not the operation information represents the pressing of the setting key on the filtering setting screen (S1550). If the operation information represents the pressing of the setting key (S1550: YES), the CPU 31 generates the input result data containing the values of the items A1-A4 on the filtering setting screen currently displayed, transmits the input result data to the embedded Web server 19 via the communication control unit 45 (S1560), and ends the process of FIG. 16.

If the operation information does not represent the pressing of the setting key (S1550: NO), the CPU 31 executes a process corresponding to the operation information and thereby updates the filtering setting screen similarly to the step S680 in FIG. 7 (S1570). Thereafter, the process returns to the step S1520.

Referring to FIG. 17, when the regular setting confirmation screen data is received, the CPU 31 of the device (PC 30) displays the regular setting confirmation screen of FIG. 10B (representing the current settings of the communication control unit 25, a message indicating that the provisional setting has been made, a message inquiring whether or not the regular setting may be made according to the provisional setting, the setting key for requesting the regular setting, and the cancel key for canceling the regular setting (invalidating the provisional setting)) in the screen (Web page) display area of the Web browser (on the display unit 41) according to the received regular setting confirmation screen data (S1610).

After displaying the regular setting confirmation screen (S1610), the CPU 31 waits until operation information representing the pressing of the cancel key or the setting key on the regular setting confirmation screen is received from the input unit 43 (S1620, S1630).

When operation information representing the pressing of the setting key is received from the input unit 43 (S1630: YES), the CPU 31 transmits the regular setting instruction data to the embedded Web server 19 of the printer 10 (destination of the connection request data) via the communication control unit 45 (S1540) and ends the process of FIG. 17. When operation information representing the pressing of the cancel key is received from the input unit 43 (S1620: YES), the CPU 31 transmits the cancellation instruction data to the embedded Web server 19 of the printer 10 via the communication control unit 45 (S1550) and ends the process of FIG. 17.

As described above, in the communication system 101 in accordance with the third example, when the embedded Web server 19 of a printer 110 receives the request data requesting the filtering setting screen (used for receiving the setting change instructions regarding the filtering function from the user) from a PC 30 via the communication control unit 25 (S1150: YES), the embedded Web server 19 transmits the filtering setting screen data (Web page), for letting the PC 30 display the filtering setting screen on the Web browser and execute the process of FIG. 16 through the Web browser, to the requesting PC 30 via the communication control unit 25 (S1170, S1180).

When the provisional setting (S1300) has been made, the embedded Web server 19 transmits the regular setting confirmation screen data (Web page), for letting the PC 30 display the regular setting confirmation screen on the Web browser and execute the process of FIG. 17 through the Web browser, to the requesting PC 30 via the communication control unit 25 (S1310, S1320).

As above, in the communication system 101 of the third example, the user is allowed to make settings of a printer 110 by use of any PC 30 that is equipped with a Web browser, by operating the PC 30 in the same way as the setting operations in the first example (to a particular PC 30 equipped with the aforementioned function setting program), without the need of installing the function setting program in the PC 30 used for making the printer settings. By the third example, a user-friendly communication system, providing improved operability in regard to the settings of devices on the network (LAN), can be realized.

While a description has been given above of preferred examples, the present invention is not to be restricted by the particular illustrative examples and a variety of modifications, design changes, etc. are possible without departing from the scope and spirit of the present invention described in the appended claims.

For example, while the filtering setting screen in the communication system 1 of the second example does not comprise the check box A3 for requesting the provisional setting, it is also possible to comprise the check box A3 in the filtering setting screen in the second example, comprise the provisional setting necessity data in the setting request data, and make the judgment of S410 based on the provisional setting necessity data.

While printers 10 having the filtering function regarding data reception have been explained in the above examples, the printer 10 (communication control unit 25) may also be provided with a filtering function regarding data transmission, discarding transmit data addressed to a device (PC 30) other than particular devices specified by prescribed address range information similarly to the filtering function regarding data reception. In such cases, the printer 10 may be configured to check the presence/absence of a communication error caused by the provisional setting by judging whether the setting change notification data or the regular setting confirmation screen data can be transmitted normally after the provisional setting or not and cancel (invalidate) the provisional setting upon detection of the communication error.

While the functions of the information processing device are installed in printers in the above examples, the functions may also be installed in various types of devices processing data received from a network, such as image capturing devices (scanners, facsimile machine, cameras, etc.), storage devices, and DCPs (Digital Copier Peripherals) and MFPs (Multi Function Peripherals) equipped with some of the above devices.

While a Web server (embedded Web server 19) is installed (embedded) in the printer 110 in the third example, the Web server may also be provided as a device separate from the printer 110. In such cases, the communication system 101 may be configured as below. When the setting change instructions (the input result data) are received from the Web browser of a PC 30 operated by the user, the Web server transmits set values to the printer 110 according to the setting change instructions. When a setting inquiry instruction (the request data requesting the filtering setting screen) is received from the Web browser of a PC 30 operated by the user, the Web server acquires current set values from the printer 110 according to the setting inquiry instruction and transmits the filtering setting screen data incorporating the acquired set values to the PC 30.

What is claimed is:

1. An information processing device connected to a network, comprising:

a communication unit which communicates with each device on a network, determines whether to accept data received from a device on the network or not based on a prescribed criterion, determines a target task selected from a plurality of tasks to which the received data is transferred based on a port number contained in the received data, and transfers the received data to the target task in response to the received data being determined to be accepted based on the prescribed criterion;

a storage unit storing the prescribed criterion indicating prescribed network addresses for which the received data having a network address as a sender is allowed to be transferred to a corresponding task; and a setting change task execution unit that executes a setting change task making a setting change to the prescribed criterion, wherein the communication unit transfers the received data to the setting change task when the port number contained in the received data corresponds to the setting change task and the received data being determined to be accepted based on the prescribed criterion, wherein the setting change task execution unit comprises:

a setting change unit which makes the setting change to the prescribed criterion of the communication unit according to instructions represented by setting request data in response to receipt of the setting request data requesting for the setting change of the prescribed criterion from a device on the network via the communication unit;

a judgment unit which judges whether the communication with the device as the sender of the setting request data is performed normally via the communication unit or not in response to the setting change by the setting change unit according to the setting request data;

a setting change notification unit configured such that, in response to the setting change having been made by the setting change unit, the setting change notification unit transmits setting change notification data representing settings changed by the setting change unit and requesting reply data to be transmitted to the setting change task, to the device as the sender of the setting request data via the communication unit; and a regular setting unit configured to make regular settings according to the settings changed by the setting change unit in response to the judgment unit judging that the communication with the device as the sender of the setting request data is performed normally via the communication unit;

wherein the judgment unit judges that the communication with the device as the sender of the setting request data is performed normally via the communication unit when regular setting instruction data is received as the reply data, from the device as the sender of the setting request data, through the communication unit, within a predetermined time period from transmission of the setting change notification data to the device, wherein the information processing device further comprises:
a setting restoration unit which restores the prescribed criterion set for the communication unit to a previous state to which the prescribed criterion has been set before the setting change by the setting change unit, in response to the judgment unit judging that the regular setting instruction data is not received as the reply data, from the device as the sender of the setting request data, through the communication unit, within the predetermined time period from transmission of the setting change notification data to the device; and
a restoration notification unit which transmits restoration notification data, wherein the restoration notification data indicates that the restoration by the setting restoration unit has been made and that the prescribed criterion have been restored from the settings of the setting change to settings of the previous state, to the device as the sender of the setting request data via the communication unit in response to the restoration having been made by the setting restoration unit, and
wherein the criterion is at least one address range, and the communication unit either:
accepts the data received from the device on the network when the network address of the device is outside the at least one address range and does not accept the data received from the device when the network address of the device is inside the at least one address range; or
accepts the data received from the device on the network when the network address of the device is inside the at least one address range and does not accept the data received from the device when the network address of the device is outside the at least one address range.

2. The information processing device according to claim 1, further comprising:
a setting unit which sets the criterion stored in the storage device to the communication unit at the startup of the information processing device,
wherein the regular setting unit updates the criterion stored in the storage device to the criterion set by the setting change unit to the communication unit in response to the judgment unit judging that the communication with the device as the sender of the setting request data is performed normally via the communication unit.

3. The information processing device according to claim 2, further comprising a regular setting notification unit which transmits regular setting notification data, indicating that the update by the regular setting unit has been made, to the device as the sender of the setting request data via the communication unit in response to the update having been made by the regular setting unit.

4. The information processing device according to claim 1, wherein the judgment unit is configured to judge that the communication with the device as the sender of the setting request data is performed normally via the communication unit in response to data being received from the device via the communication unit within a prescribed time period from the setting change by the setting change unit, while judging that the communication with the device can not be performed normally via the communication unit in response to data can not being received from the device via the communication unit within the prescribed time period.

5. The information processing device according to claim 1, wherein the setting change notification unit transmits setting change notification data, indicating that the setting change by the setting change unit has been made, to the device as the sender of the setting request data via the communication unit in response to the setting change having been made by the setting change unit.

6. The information processing device according to claim 1, wherein:
the communication unit determines to accept the data received from a device on the network in response to an address of the device as the sender of the data being within the address range represented by the criterion, while determining not to accept the data received from the device in response to the address of the device being outside the address range represented by the criterion.

7. The information processing device according to claim 1, wherein:
the communication unit determines to accept the data received from a device on the network in response to an address of the device as the sender of the data being outside the address range represented by the criterion, while determining not to accept the data received from the device in response to the address of the device being within the address range represented by the criterion.

8. The information processing device according to claim 1, further comprising a setting screen transmission unit which transmits setting screen data, to be used by a device on the network for displaying a setting screen for receiving setting change instructions regarding the criterion from a user and transmitting the setting request data representing the setting change instructions inputted by the user referring to the setting screen to the information processing device, to the device via the communication unit in response to data requesting the setting screen being received from the device via the communication unit.

9. The information processing device according to claim 8, further comprising a confirmation screen transmission unit which transmits confirmation screen data, to be used by the device as the sender of the setting request data for displaying a confirmation screen for receiving a regular setting instruction from the user and transmitting test data to the information processing device according to the regular setting instruction inputted by the user referring to the confirmation screen, to the device via the communication unit in response to the setting change having been made by the setting change unit, wherein:
the judgment unit is configured to judge that the communication with the device as the sender of the setting request data is performed normally via the communication unit in response to the test data being received from the device via the communication unit within a prescribed time period from the transmission of the confirmation screen data by the confirmation screen transmission unit, while judging that the communication with the device can not be performed normally via the communication unit in response to the test data can not being received from the device via the communication unit within the prescribed time period.

10. A method for setting change to be implemented on a computer, provided with: a communication unit which communicates with each device on a network; and a storage unit storing the prescribed criterion indicating prescribed network addresses for which the received data having a network address as a sender is allowed to be transferred to a corresponding task, the method comprising the steps of:
receiving data from a device on the network through the communication unit;
determining whether to accept data received from a device on the network or not based on the prescribed criterion;

determining a target task selected from a plurality of tasks to which the received data is transferred based on a port number contained in the received data, and transferring the received data to the target task in response to the received data being determined to be accepted based on the prescribed criterion;

transferring the received data to a setting change task when a port number contained in the received data corresponds to the setting change task and the received data being determined to be accepted based on the prescribed criterion;

executing the setting change task by making a setting change to the prescribed criterion of the communication unit according to the instructions represented by setting request data, in response to receiving the setting request data;

transmitting setting change notification data, which represents settings changed to the prescribed criterion and requests reply data to be transmitted to the setting change task, to the device via the communication unit, in response to the setting change having been made;

judging that the communication with the device is performed normally via the communication unit when regular setting instruction data is received as the reply data, from the device as the sender of the setting request data, through the communication unit, within a predetermined time period from transmission of the setting change notification data to the device;

making regular settings according to instructions represented by the regular setting instruction data, in response to the judging that the communication with the device is performed normally via the communication unit; and restoring the prescribed criterion set for the communication unit to a previous state to which the prescribed criterion has been set before the setting change by the setting change unit, and transmitting restoration notification data, which the restoration notification data indicates that the restoration has been made and that the prescribed criterion have been restored from the settings of the setting change to settings of the previous state that the prescribed criterion has been restored, to the device as sender of the setting request data via the communication unit, in response to the judging that the regular setting instruction data is not received as the reply data, from the device as the sender of the setting request data, through the communication unit, within the predetermined time period from transmission of the setting change notification data to the device, wherein the criterion is at least one address range, and the communication unit either:

accepting the data received from the device on the network when the network address of the device is outside the at least one address range and does not accept the data received from the device when the network address of the device is inside the at least one address range; or accepting the data received from the device on the network when the network address of the device is inside the at least one address range and does not accept the data received from the device when the network address of the device is outside the at least one address range.

* * * * *